United States Patent
St. John 4,007,481
Feb. 8, 1977

[54] HOLOGRAPHIC COLOR TELEVISION RECORD

[75] Inventor: Daniel S. St. John, Hockessin, Del.

[73] Assignee: Holotron Corporation, Wilmington, Del.

[22] Filed: May 16, 1975

[21] Appl. No.: 578,093

Related U.S. Application Data

[62] Division of Ser. No. 454,923, March 26, 1974, Pat. No. 3,900,884, which is a division of Ser. No. 884,078, Dec. 11, 1969, Pat. No. 3,813,685.

[52] U.S. Cl. .................................... 358/2; 350/3.5
[51] Int. Cl.² ...................................... H04N 9/02
[58] Field of Search ............... 358/2, 6, 7; 350/3.5

[56] References Cited

UNITED STATES PATENTS

| | | | |
|---|---|---|---|
| 3,535,992 | 10/1970 | Goldmark et al. | 358/7 X |
| 3,567,305 | 3/1971 | Collier et al. | 350/3.5 |
| 3,746,783 | 7/1973 | Garritson et al. | 358/2 X |
| 3,763,311 | 10/1973 | Bartolini et al. | 358/2 |

*Primary Examiner*—Benedict V. Safourek
*Assistant Examiner*—Mitchell Saffian
*Attorney, Agent, or Firm*—Woodcock Washburn Kurtz & Mackiewicz

[57] ABSTRACT

A method and apparatus for constructing and relaying an optical holographic record containing a plurality of very small holograms, each of which contains color information independent of the other holograms. Each piece of full color information, such as a frame of an ordinary color photographic movie, is recorded as an individual hologram. The record is a narrow, elongated flexible film with the holograms formed in a line along its length, each hologram touching those on either side thereof. One or more light sensitive detectors for converting an image into a time varying electronic signal are positioned to receive holographically reconstructed signals and transform them into a form acceptable to an ordinary color television set for displaying the color information thereon. One, two and three image detecting tube systems are disclosed. Several independent monochromatic components of a color information signal are carried on a single optical-electronic channel by modulation onto carrier frequencies either optically or electronically prior to construction of the hologram record. In a preferred embodiment described, the hologram record is constructed in a manner to reconstruct a broad bandwidth luminance signal in a position spatially separated from the color component signal.

2 Claims, 47 Drawing Figures

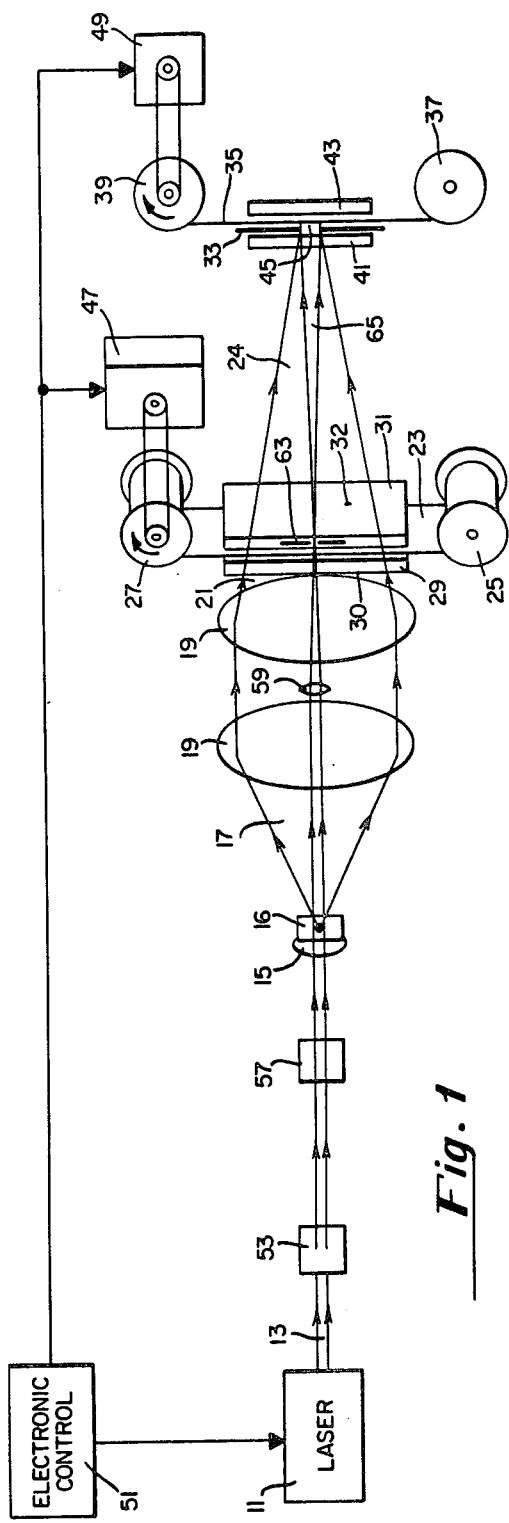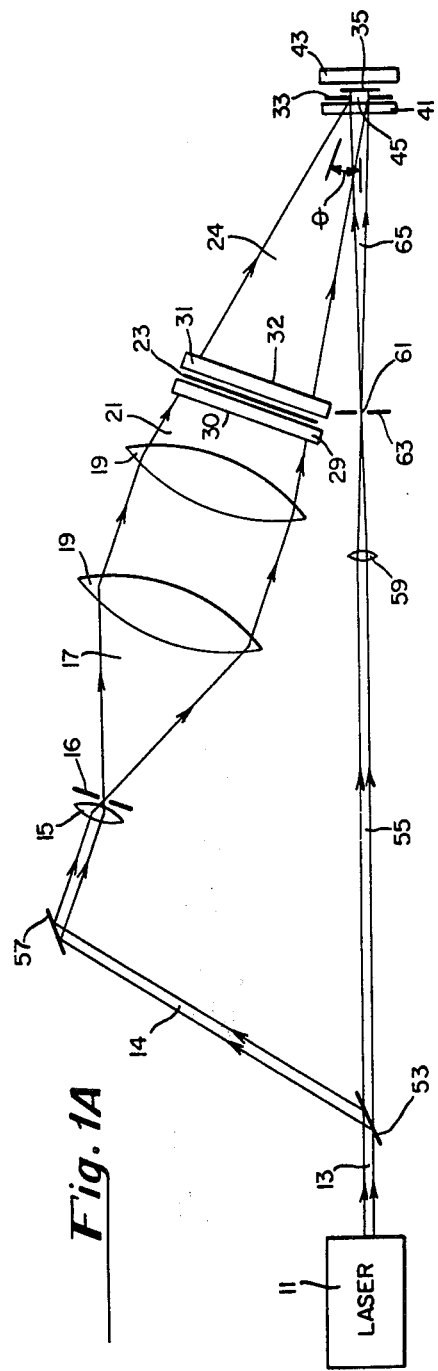

(BLUE)

(RED)

(GREEN)

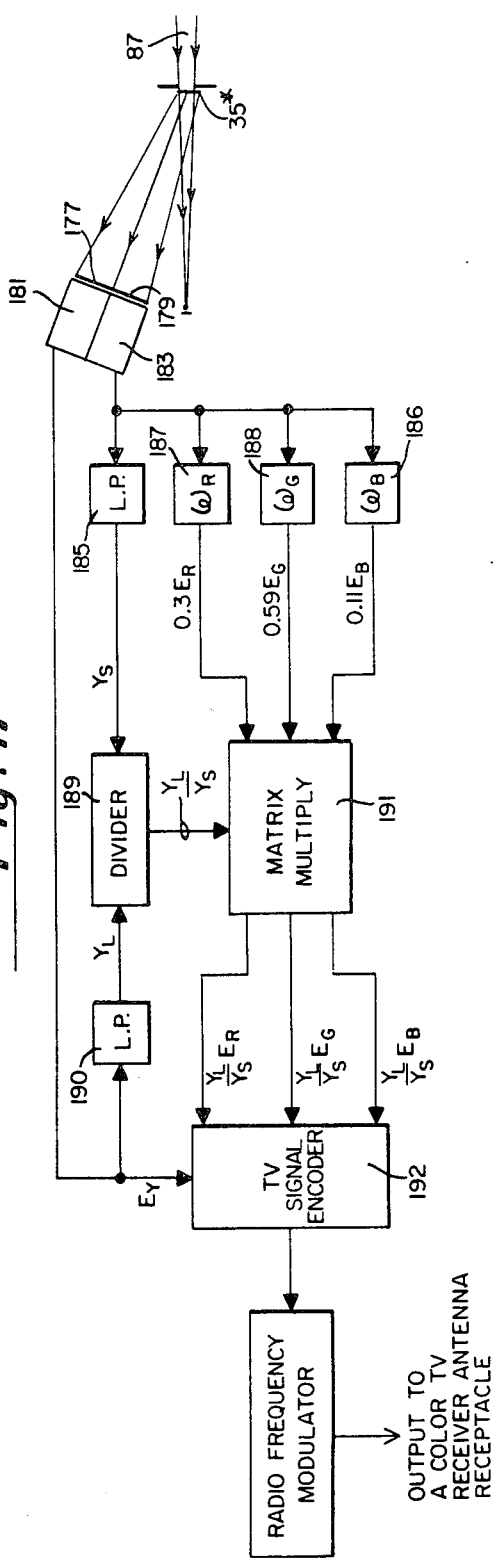
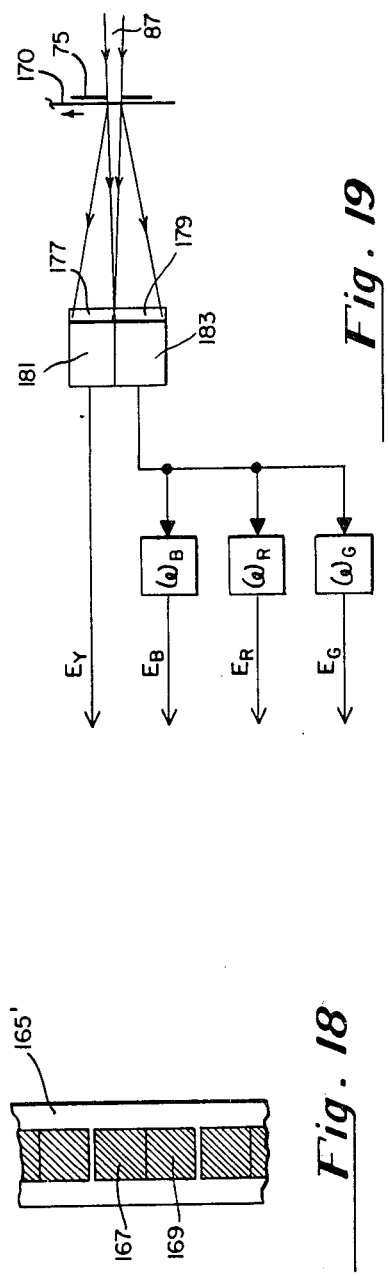
Fig. 17
Fig. 19
Fig. 18

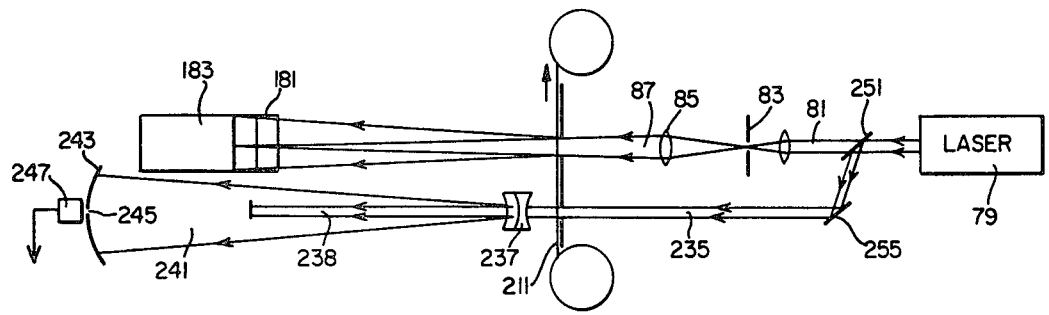
Fig. 24
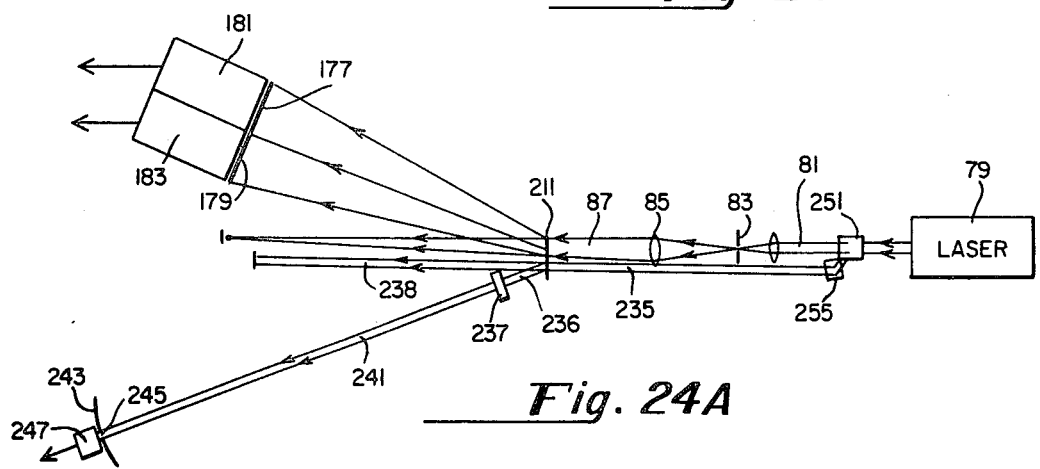
Fig. 24A
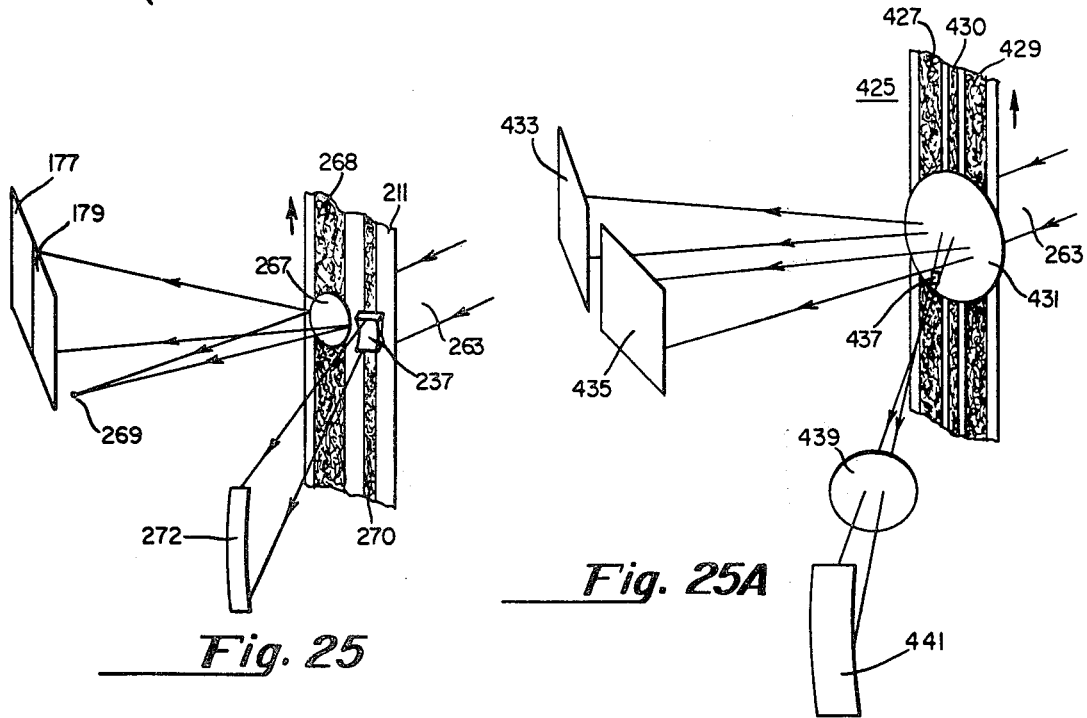
Fig. 25
Fig. 25A

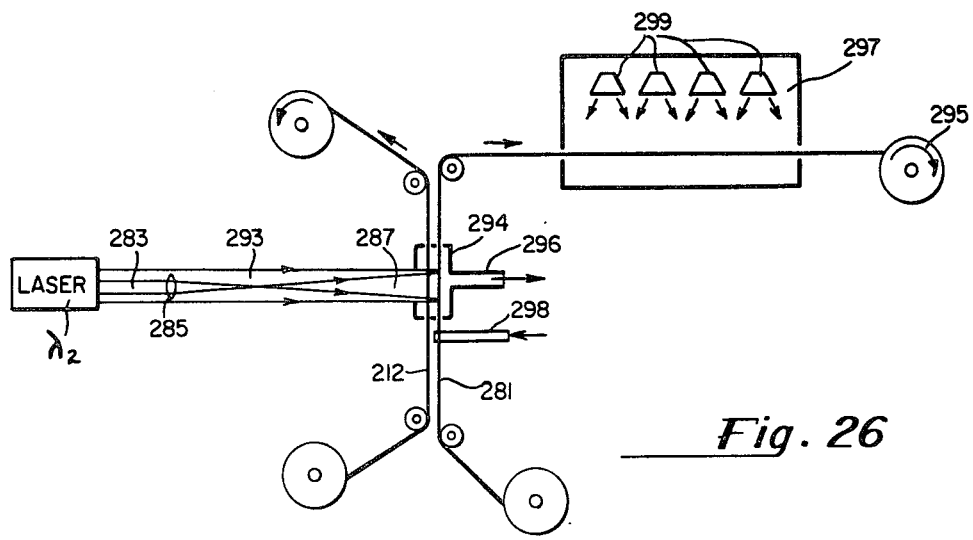
_Fig. 26_
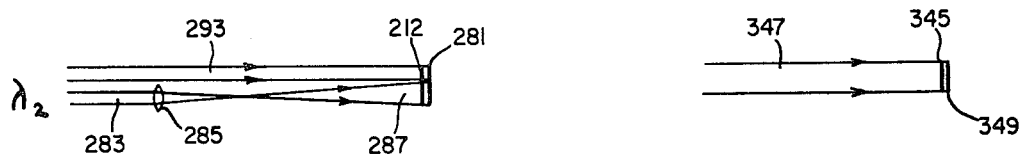
_Fig. 26A_
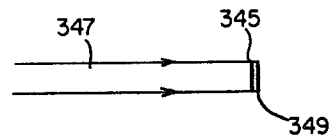
_Fig. 26B_
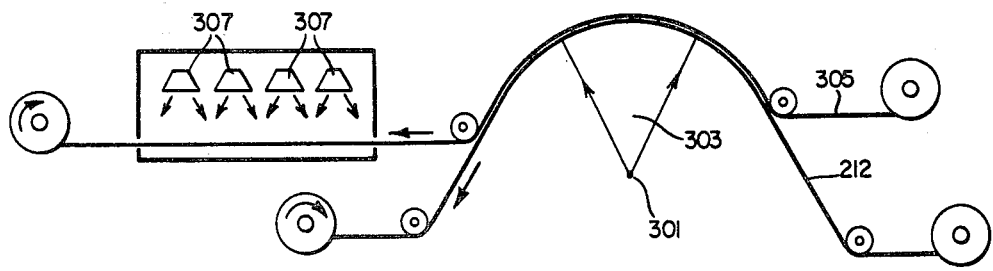
_Fig. 27_

HOLOGRAPHIC COLOR TELEVISION RECORD

This is a division, of application Ser. No. 454,923, filed Mar. 26, 1974, now U.S. Pat. No. 3,900,884, which is a division of Ser. No. 884,078 filed Dec. 11, 1969, now U.S. Pat. No. 3,813,685.

BACKGROUND OF THE INVENTION

This invention relates generally to holography and more specifically to high density storage of color visual information on a monochromatic photosensitive record member.

The invention of off-axis holography is described by Leith and Upatnieks in the *Scientific American*, June, 1965, pages 25–35, and in their copending patent application Ser. No. 361,977. Briefly described, the basic off-axis holographic technique includes interfering two coherent beams of light, which are also coherent with each other, at a photosensitive detector and at some finite angle with each other. One of the beams contains in its wavefront the information to be recorded. For instance, one of the beams may be modified by an object. The other beam serves as reference energy and thus, the phase and amplitude of the information carrying wavefront are recorded on the hologram detector. The information carrying wavefront is reconstructed from the finished hologram upon its illumination with coherent light in a beam that is physically related to the reference wavefront beam used to construct the hologram. A viewer positioned in the path of this reconstructed information carrying wavefront is able to observe an image of the original object in full three-dimensions as if he were observing the object itself.

There are various modifications of this basic off-axis holographic technique that provide for reconstructing three-dimensional images in full color. One example of a color holographic technique is described in the aforementioned article and copending patent application, wherein an object is holographically recorded on one monochromatic photosensitive detector by constructing a distinct hologram for each of three primary colors. Each of these distinct holograms is readout by coherent light of a different wavelength, thereby to reconstruct three monochromatic images of an object which are superimposed to form a full color image of an object. A disadvantage of such techniques is the necessity for use of coherent light containing three different colors since either three individual laser sources or a complicated three color laser is required.

Therefore, it is an object of this invention to provide a color holographic recording technique wherein full color information may be retrieved with a monochromatic light source.

It is also an object of this invention to provide a color holographic recording and playback technique for greatly reducing the area of a record necessary to store a given amount two-dimensional information.

It is a further object of this invention to provide a holographic information storage record containing a large number of independent items of two dimensional color information.

It is an additional object of this invention to provide a technique of holographically recording an ordinary color photographic movie onto a hologram record and to provide a technique of reconstructing an apparently moving picture image from a hologram record for display on a television screen.

It is an object of this invention to provide a simple and reliable television color image converting apparatus.

SUMMARY OF THE INVENTION

These and further objects are realized in accordance with the techniques of the present invention wherein, generally, color visual information is separated into components, the components recorded on a black-and-white photosensitive material to form a color coded transparency in a manner so that each component is separably retrievable therefrom, and a hologram of the transparency is constructed with coherent light of a single wavelength according to the techniques of off-axis holography, the hologram being constructed to occupy an area which is much smaller than that of the coded transparency of which the hologram is made. Such a hologram is reconstructed with a coherent light beam of a single wavelength in a manner to reconstruct a monochromatic image of the coded transparency. One or more image detectors (image converters) are positioned to receive an image of the coded transparency and to generate a time varying electronic signal which is processed by electronic circuits into a composite signal appropriate for acceptance by color television apparatus to display thereon the color information which was originally the subject of the recording process. The number of image detecting tubes and the specific nature of the associated electronic circuitry required for color television readout of the hologram record depends upon the particular signal processing which was performed during construction of the coded transparency.

There are a large number of specific types of color visual information which may be so recorded. For instance, the original color information may be of a three-dimensional color object scene, a two-dimensional color reflective object such as a book page or photograph, or the color information may originate from a two-dimensional color transparency. Several individual holograms of different pieces of color information may be recorded on a single hologram record at distinct areas thereof to allow individual retrieval of any piece of color information recorded on the hologram record. A very useful hologram record in an elongated thin flexible film having a plurality of small individual holograms constructed in a line along its length wherein each hologram is constructed of a different frame of a continuous moving object scene so that an apparently moving picture is reconstructed. The holograms are constructed on the hologram record in a touching relationship with each other. The information reduction brought about by the use of holography requires much less record area for a given amount of color picture information than most other techniques known heretofore, thereby making it attractive to consumers to replay hologram records of lengthy movies or other like material in full color.

The form of the color information which is separated into its monochromatic components, processed and recorded onto a color coded black-and-white transparency may be, for example, time sequence information such as that recorded on magnetic tape by known color television recording techniques. The separation and processing of electronic information replayed therefrom is accomplished prior to the construction of the coded transparency and preferably by electronic methods since the information is originally in an electronic form. The separated and processed information may be displayed, for example, on a cathode ray tube or on a light array as a source for exposing the coded transparency or record onto the transparency by other techniques known in the art. Such information is not holographically recorded directly from a cathode ray tube or a light array because of the difficulty of limiting the exposure of the hologram detector to coherent light.

Another common form in which the original color information is found is in a two-dimensional record such as a transparency. The separation and processing of such information may be accomplished electronically but optical data processing techniques may be preferred since the information is originally in an optical form. The processed information is recorded onto a color coded black-and-white transparency from which a hologram record is constructed. Several specific optical processing techniques are described in detail hereinafter. A preferred technique, briefly, is to initially separate the color information into a broad band luminance optical signal and a color component optical signal which are recorded on adjacent but distinct areas of the color coded transprency. A hologram record constructed of the coded transparency reconstructs spatially separate luminance and color signals.

It should be noted that a significant advantage of a hologram constructed according to the present invention is the simplicity of a record player required to reconstruct images therefrom. The color information signal separation and processing is accomplished prior to making the hologram record so that apparatus to read out the hologram record need not be provided as part of the record player as would be required if ordinary color holographic techniques were utilized wherein the full color information signal were reconstructed directly from the hologram record in the record player. Furthermore, color information signal separation and processing prior to constructing the hologram has a further advantage since the record player need contain only a single color substantially monochromatic light source instead of the multicolored one which would be required to reconstruct a full color image according to techniques of color holography. The color information of the total color signal is processed prior to making a hologram record in a manner to minimize the electronic processing necessary in reconstructing the hologram record.

For a more detailed disclosure of the invention and for further objects and advantages thereof, reference should be had to the following description taken in conjunction with the accompanying drawings.

BRIEF DESCRIPTION OF THE DRAWINGS

FIGS. 1, 1A, 1B, 1C and 1D illustrate an arrangement for constructing a hologram record according to this invention;

FIG. 17 illustrates the reconstruction of either the hologram record shown in FIG. 15 or the hologram record shown in FIG. 16;

FIG. 18 shows an alternate form of the color coded transparency of FIG. 13;

FIG. 19 shows a modification of the record player of FIG. 17 for reconstructing images from a hologram record constructed of the transparency of FIG. 18;

FIG. 24 shows a side view of a record player for reconstructing video and sound information from a hologram record such as that shown in FIG. 23;

FIG. 24A is a top view of the record player of FIG. 24;

FIGS. 25 and 25A illustrate additional techniques for reconstructing information from a hologram record;

FIGS. 26 and 26A schematically illustrate in side and top views, respectively, a technique of copying a master hologram record;

FIG. 26B shows a modification of FIGS. 26 and 26A; and

FIG. 27 illustrates an alternate technique of copying a hologram record.

DESCRIPTION OF THE PREFERRED EMBODIMENTS

Figure 1C:
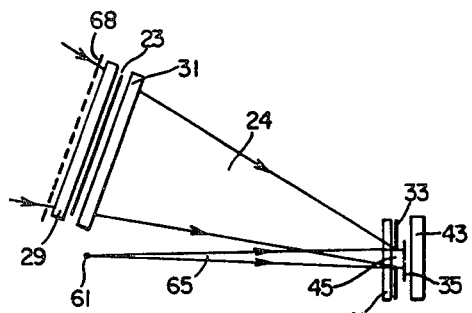

A holographic record for readout through a television receiver preferably has the characteristic that the record may be moved at a uniform speed past a readout station. Also, illumination of the record is preferably continuous to be compatible with holographic sound recording, or pulsed at a high rate which makes it appear continuous to an image detector, without need for shuttering or pulsing in synchronism with the film movement. This greatly simplifies the record player and thereby makes it possible to produce such apparatus at a reasonable cost and with high reliability for use in the home as an attachment to an existing television receiver. FIG. 1 illustrates a side view of essential elements for constructing such a holographic record from an ordinary black-and-white photographic movie. FIG. 1A is a top view of the optical system of FIG. 1. A coherent light source 11 generates a narrow beam of light 13 which is partially reflected by a beam splitter 53 into a light beam 14 which is then reflected by a mirror 57, expanded by a lens 15 and passed through a pinhole filter 16 to form a diverging beam 17. The diverging beam 17 is passed through an optical system 19 to produce a converging beam 21. The beam 21 is passed through the black-and-white photographic movie 23 which is to be holographically recorded, thereby producing an object-modified beam 24. The movie 23 is stored in some convenient manner by a roll 25 and moved upward through the coherent light beam 21 in response to an urging of an appropriate take-up reel 27. The movie 23 is passed between flat glass members 29 and 31 which guide the film 23 along a predetermined path through the coherent light beam 21. An optically clear liquid is contained between the members 29 and 31 to reduce friction of the film moving therebetween and additionally to serve as an optical "gate" by having an index of refraction intermediate of the index of refraction of the glass in the members 29 and 31 and the index of refraction of the movie 23. Such refractive index matching reduces reflections of light at the movie contacting surfaces of the glass members 29 and 31. The optically clear liquid is chosen to be one that does not fluoresce at the wavelength of light emitted by the laser 11. All optical elements used in constructing the hologram record are carefully designed to prevent reflections which cause interference patterns that are recorded downstream at the holographic detector. One way to substantially reduce such reflections is to coat the elements with an anti-reflection layer. Therefore, glass member 29 is anti-reflection coated at its incident surface 30 to reduce reflections. Similarly, the glass member 31 is anti-reflection coated at its exit surface 32 to reduce reflections.

The optical system 19 is designed to image the pinhole of the pinhole filter 16 into a point much smaller than the size of an individual hologram to be constructed. This requires that extremely uniform surfaces be provided on the individual elements of the optical system 19. The beam control system 19 is preferably positioned in the movie transparency illuminating beam before the transparency, as shown, but, alternatively, a portion of the optics may be placed in the object-modified beam 24 downstream of the movie 23.

The optical system 19 is carefully controlled to eliminate bubbles, scratches, dirt, and other light scatterers from the light beam path, thereby maintaining a uniform intensity across those planes of the coherent light beam 21 at which the movie 23 is likely to be placed. Eliminating the light scatterers in the light beam path prevents the formation of annoying diffraction patterns which result from interference of light scattered by such imperfections with the substantially uniform wavefront which passes through a non-diffuse object transparency such as the movie 23.

The individual hologram size and shape is determined by an aperture 45 of a mask 33 placed in front of a photosensitive hologram detector 35. The detector 35 is in the form of an elongated thin flexible film stored on an appropriate reel 37 and drawn behind the mask 33 onto a take-up reel 39. Glass members 41 and 43 are provided on either side of the detector 35 to provide support thereof and with a liquid optical gate therebetween to reduce reflections. Also, the incident surface of the glass member 41 and the exit surface of the glass member 43 are anti-reflection coated or otherwise treated to prevent significant light reflection at these surfaces. The aperture 45 of the mask 33 may have any one of a wide variety of shapes and for the specific movie embodiment described herein, the aperture 45 is preferably square or rectangular.

Each frame of the movie 23 is recorded onto an individual hologram at the holographic detector 35. An appropriate motor and gear drive 47 is operably connected to the take-up reel 27 for advancing the movie 23 between frames. Similarly, a motor and gear apparatus 49 is operably connected to the take-up reel 39 for simultaneously advancing the holographic detector 35. The coherent light source 11 is preferably a pulsed laser with sufficient intensity to record a hologram of a single frame of the movie 23 in one pulse. Between pulses, the movie 23 is advanced to place a new frame within the light beam 21 and the holographic detector 35 is simultaneously advanced an amount to place an unexposed portion of the detector behind the aperture 45. Suitable automatic equipment may be employed, including a common electronic control 51, for synchronizing the laser pulses with the movie and detector advance. The hologram detector may be advanced intermittently between laser pulses or may be advanced uniformly if the laser pulse is short enough. Similarly, the movie film may also be advanced either intermittently or uniformly.

The hologram detector 35 is placed in the object-modified beam 24 in front of or behind the point focus of the beam 24 which represents an image of the pinhole filter 16. Furthermore, the detector 35 is positioned at a plane of substantially uniform intensity thereacross in the absence of the movie 23. This positioning avoids introducing distortions into a reconstructed image which are caused by overdriving a hologram detector with light intensity in one small portion thereof while underdriving the detector in other areas thereof.

In order to record holographic information on the detector 35, a reference beam is required for interference with the information carrying beam 24 at the detector 35. The reference beam is provided by passing a portion of the intensity of the beam 13 through the beam splitter 53 to provide a beam 55 which is then passed through a lens 59 which brings the beam to a point focus in an aperture 61 of a pinhole mask 63. Beyond the point focus 61, a diverging beam 65 illuminates the holographic detector at a finite angle $\theta$ with the information carrying beam 24 to form a hologram each time the coherent light source 11 is pulsed. In order to be able to reconstruct a holographic record constructed in this manner with a continuous motion of the hologram record and with a shutterless continuous wave laser, the point focus 61 of the reference beam is located a distance from the hologram detector 35 that is the same as a distance between the movie 23 and the hologram detector 35. That is, the wavefront reference beam 65 striking the holographic detector 35 is given a radius of curvature substantially equal to the distance $d$ shown in FIG. 1B between the movie and the detector. This radius of curvature may be provided by a wide variety of specific optical arrangements other than that illustrated in FIG. 1, as is well known.

It will be noted from FIG. 1 that the reference beam point focus 61 lies in a plane that is perpendicular to the detector 35 and that intersects it in a line across the detector normal to its length and passing through the aperture 45. That is, in FIG. 1, the rays of the reference beam 65 are substantially normal to the motion of the detector 35. With this angle of intersection of the reference beam with a detector of finite size, a hologram record so constructed has image motion upon reconstruction that is less that than image motion which results from a hologram constructed with some other reference beam angle of intersection.

Since the reference beam 65 passes through the aperture 45 in the recording of each hologram, annoying diffraction patterns may be produced by the aperture 45, particularly if the aperture has sharp edges. These diffraction patterns will be recorded by the hologram and, if they fall in the image field, they will produce undesirable noise. This effect can be overcome by spatially arranging the image field with respect to diffraction patterns, and/or by specially designing the aperture 45. One technique is to construct each hologram to locate its reconstructed image so that it is spatially separated from the diffraction pattern produced by the aperture 45, either by making the reference beam angle $\theta$ sufficiently large or by locating the image away from the diffraction pattern of the aperture. For instance, the diffraction pattern from a square aperture forms, upon reconstruction of an image, two perpendicular lines passing through the aperture. Thus, with this pattern, the area lying along diagonals of the diffraction pattern is free of diffracted light and the image can be located in these regions.

Another and perhaps preferred method to minimize the aperture caused noise is to apodize the aperture so that the aperture has a transmission function that is a gradual change from the minimum to maximum values as opposed to the step transmission function associated with an aperture with sharp edges. This apodized aperture will then produce a diffraction pattern in which most of the diffracted light is located in the near vicinity of the reference beam and thus will not extend very far toward the image field.

Figure 1B:
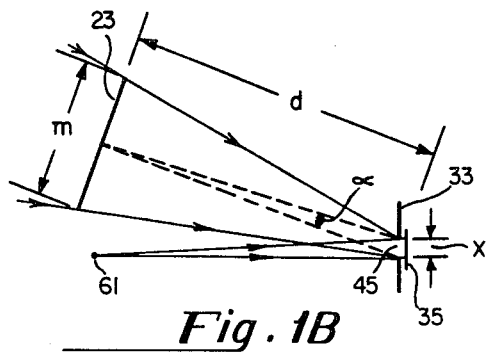

Referring to FIG. 1B, certain elements of FIG. 1A are repeated with distances and element sizes indicated. The extend $x$ of the hologram aperture 45 is chosen to be small enough to minimize the size, and thus the cost of the final hologram record which includes a large number of small holograms, each having substantially the area of the aperture 45. Once $x$ is determined, the photosensitive detector 35 is positioned a distance $d$ from the movie 23 that is small enough to give a reconstructed image resolution that is as good as that required for a particular application. Once $x$ and $d$ have been determined, the $f$-number of the optical system 19 follows.

Considering a specific example wherein images from a hologram record are to be reconstructed through an ordinary television apparatus, each reconstructed image should have a resolution of about 500 elements since television resolution capability is about 500 lines per frame. That is, the resolution element size $\delta$ of a reconstructed image from the hologram record should be about $m/500$, where $m$ is the extent of the movie 23 being recorded, as shown in FIG. 1B. For a hologram of the type considered herein, $$\delta = \frac{1.54 \lambda}{\sin \alpha} \quad (1)$$

where $\lambda$ is the wavelength of the light utilized and $\alpha$ is the angular size of the hologram aperture 45 as viewed from the movie 23. For a small angle $\alpha$, as is the case here, $\sin \alpha \simeq x/d$. Therefore, $$d \simeq \frac{\alpha x}{1.54 \lambda} \quad (2)$$

In a typical application of the techniques herein, the movie 23 is of the 35mm. variety wherein each frame has a maximum dimension of about $m = 20$mm. Therefore, $\delta = 20$mm/500 or 0.04mm. A convenient hologram size (and thus the size of the aperture 45) for economy in the size of the completed hologram record is about $x = 1$mm. Substituting these values into equation (2) gives a distance between the detector 35 and the movie 23 of $d \simeq 43$mm. when light having a wavelength $\lambda = 0.6 \times 10^{-3}$mm. is employed. By the geometry of FIGS. 1–1C, therefore, the f-number of the optical system 19 should be about $d/m$, or, in this specific example, approximately f2. The minimum resolution capability required of the hologram detector is determined by the f-number of the system and the light wavelength.

It may be noted from this example that the light wavelength $\lambda$ is within the visible spectrum in the red region. It may be noted from equation (1) that if the wavelength is made shorter, the resolution element size $\delta$ decreases, thereby increasing the resolution of the system. The wavelength utilized depends upon laser availability and characteristics of the photosensitive material used in the hologram detector. A photopolymerizable material that is sensitive to ultraviolet radiation in the near visible region may be utilized, as described in detail hereinafter. Radiation having a wavelength $\lambda = 0.35 \times 10^{-3}$mm. to which a photopolymer material is sensitive may be generated by an available ultraviolet laser, thereby to increase the resolution capability of an optical system designed for use with visible light radiation.

Figure 2:
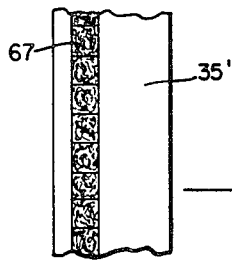
FIG. 2 shows one specific form of a hologram constructed according to FIGS. 1 and 1A.

After recording the photographic movie 23 one frame at a time onto the holographic detector 35 and after processing the detector, a holographic record 35' results, a portion of which is illustrated in FIG. 2. For this record, a plurality of holograms are constructed with a substantially square aperture 45 in the configuration of FIGS. 1 and 1A, each hologram containing information of one frame of the movie 23. Each hologram illustrated here is about 1 mm. square on a flexible film record with a width of about 4 mm. Each individual hologram is placed onto the film 35 so that it just touches those on either side of it, or perhaps even with some overlap, to prevent flicker during reconstruction. The individual holograms constructed may be circular but such a shape is not preferred since less efficient use of available detector area results as well as flicker due to some space between individual holograms.

As can be seen from a portion of the holographic record 35' shown in FIG. 2, there has been a drastic reduction in the amount of film necessary to store the information formerly stored on ordinary photographic film. The usual 35 mm. movie has an individual frame size of 14 mm. × 20 mm. which may be recorded on an individual hologram 1 mm. square. The length of a holographic record constructed according to the techniques of this invention is approximately 7% of the length of a 35 mm. movie. Also, it can be seen from FIG. 2 that even with a narrow 4 mm. hologram film record width there remains room for another channel of picture information or the addition of color information, as well as a channel of continuous sound information.

Figure 3:
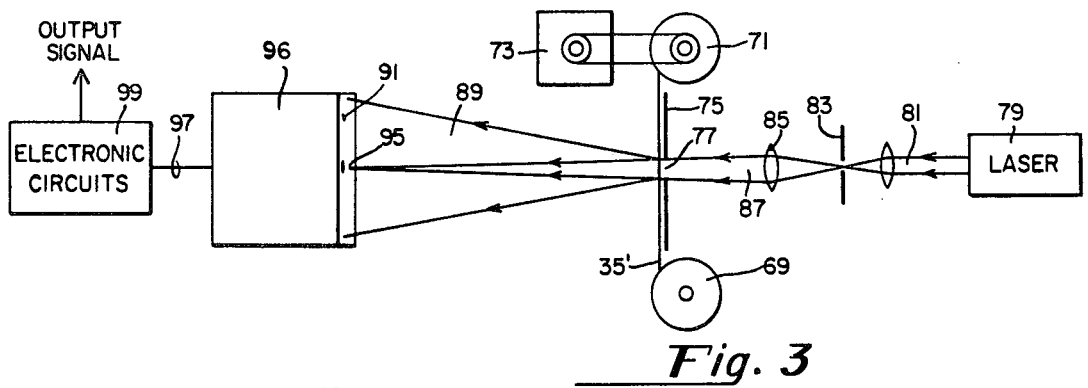
FIGS. 3 and 3A illustrate in side and top views, respectively, the reconstruction of the hologram record shown in FIG. 2.
Figure 3A:
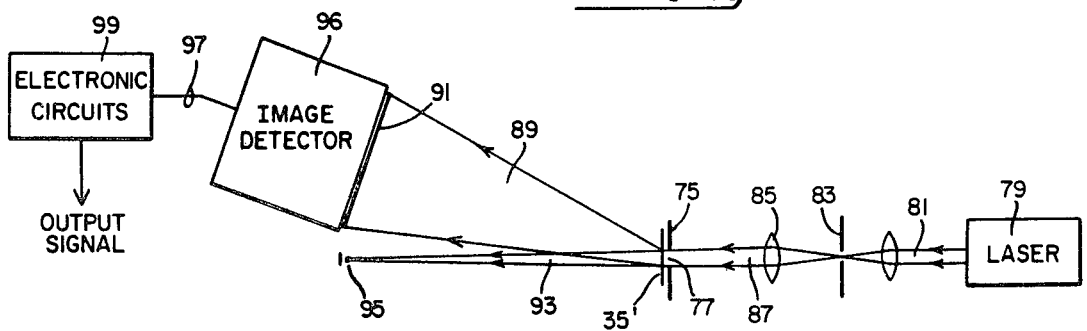

The holographic record 35' of FIG. 2 is reconstructed according to the techniques illustrated in FIGS. 3 and 3A. FIG. 3 represents a side view of a hologram record player and FIG. 3A is a top view. The holographic movie 35' is stored on an appropriate reel 69 and transferred to a take-up reel 71 at a uniform speed by some appropriate motor source 73. A mask 75 having an aperture 77 corresponding to the dimension of the individual holograms on the holographic record 35', and thus corresponding to the dimensions of the hologram aperture 45, is placed along one side of the continuously moving holographic record 35'. The aperture 77 may be apodized to reduce diffraction noise in a reconstructed image. This aperture is illuminated by a low power continuous wave laser 79 whose narrow beam 81 is passed through a pinhole filter 83 to improve its spatial coherence, and then is formed by an optical element 85 into a converging beam 87. A portion of the intensity of the reconstructing light beam 87 is diffracted into an image carrying first order beam 88 by a hologram recorded on the holographic record 35'. An image 91 is formed in the diffracted first order beam 89 in real space. A zero order light beam 93 (undiffracted) comes to focus at a point 95 which is the center of curvature of the beam 87 and is out of the path of image carrying beam 89. The image 91 is located in relation to the zero order point focus 95 as the movie 23 of FIGS. 1 and 1A is located in relation to the reference beam focal point 61 during the hologram construction. The curvature of a reconstructing light beam in holography is generally chosen to be substantially the same as the reference beam used in constructing the hologram in order to prevent image distortion. However, distortion between the radial and lateral magnifications of a reconstructed image is unimportant for the application herein since only a two dimensional reconstruction is desired. Therefore, the precise degree of curvature of the reconstructing light beam 87 is not so restricted herein for image quality. The reconstructing light beam 87 strikes the hologram 35' from the side opposite that illuminated during its construction and with an opposite curvature direction, in order to directly reconstruct an image in real space. The precise degree of curvature of the reconstructing beam 87 and its angle of intersection with the hologram record 35' are chosen to reconstruct an image of a proper size for matching the size of an image detecting tube 96. A simplfied apparatus for controlling this beam curvature is described hereinafter with respect to FIGS. 4B and 23 wherein a lens is placed on the image side of the hologram record.

The image detector 96 converts intensity variations across the reconstructed image 91 into a time varying electronic signal. An image detector suitable for use herein, such as a television camera tube, a vidicon tube or a photodetection matrix, is commercially available. A time varying electronic signal 97 representing a raster scan of the reconstructed image is connected with a television receiver (not shown) for displaying thereon a movie from the holographic record. As one hologram recorded on the holographic record 35' moves out of the aperture 77 and another hologram moves within the aperture, the image 91 changes from that recorded on the one hologram to the image recorded on the other hologram. The images do not move across the face of the image detector as the individual holograms are moved past the aperture 77. This results primarily from the curvature control of the reference beam 65 as described hereinbefore. An image 91 reconstructed from the one hologram merely fades out as an image formed form reconstructing the next adjacent hologram fades in while superimposed on the image formed from the prior hologram. It is this characteristic of a holographic record constructed and reconstructed according to the techniques outlined herein that plays a significant part in making it possible for a simplified record playback apparatus. The successive formation of images in this manner provides information for the image detector which is the same as it would receive if scanning the real world through the optical system of a television camera. It should be noted that this characteristic eliminates the need for recording a synchronizing pulse on the holographic record to control the image detector's raster scanning of the image. The holographic record making operation is additionally simplified since ordinary photographic movies of varying frame rates may all be constructed in the same manner; that is, one small hologram is constructed for each frame of the film. The continuous speed at which the holographic record 35' is moved during reconstruction is ultimately determined by, among other factors, the frame rate of the photographic movie recorded thereon but there is no need to match this frame rate with that of the image detector's.

The electronic signal 97 is processed by appropriate electronic circuits 99 which may be designed to produce an output signal for connection with the internal circuits of a television receiver but preferably includes circuits for modulating the picture signal 97 onto a radio frequency carrier so that the output signal may be fed into the antenna jack of a home television receiver. This preferred apparatus allows for connecting a holographic record player to an individual television receiver without need for its modification.

A hologram record constructed and reconstructed according to the techniques illustrated in FIGS. 1–3A is subject to being scratched and having dirt particles adhere thereto. If this occurs in an area of a record where a hologram is recorded, the image reconstructed from that hologram is likely to have diffraction pattern noise superimposed thereover. The movie illuminating beam 21 of FIGS. 1 and 1A is carefully controlled to have a highly uniform wavefront striking the movie 23. Upon reconstruction of a hologram, this highly uniform wavefront is reconstructed in the beam 89 of FIGS. 3 and 3A. Any dirt or scratches on the hologram scatter a portion of the reconstructing light beam 89 intensity. This scattered light interferes with the highly uniform reconstructed wavefront to form diffraction patterns at the plane of the image 91. Therefore, a hologram record is coated with a material to reduce the likelihood that scratches or dust will become a part of the record. Also, the mechanical components of the record player are carefully designed to reduce scratches and dust.

However, in order to provide a long life hologram record capable of a large number of plays, it is also desirable to construct each hologram in a manner to be less sensitive to dust and scratches. This may be accomplished by modulating the object illuminating beam 21 of FIGS. 1 and 1A in a particular manner so that the wavefront striking the movie 23 is no longer highly uniform in phase and amplitude across the beam. A modification of FIG. 1A is shown in FIG. 1C wherein a modulating structure 68 is inserted in the path of the beam 21. One method of modulation utilizes a structure 68 which imparts either a periodic phase or a periodic amplitude variation across the beam as it passes through the movie transparency 23. When an image is reconstructed from a hologram so constructed, any scattered light due to scratches or dirt on the hologram will interfere with a periodically phase or amplitude varying wavefront in the plane of the image 91. The diffraction pattern is thereby broken up and is not as objectionable to the viewer of the reconstructed image. Furthermore, if the period of the phase or amplitude variation is chosen to be less than an image element resolvable by the viewing system including a television set and the image detector 96, the pieces of the diffraction pattern remaining are not observable by a viewer of the television set. These pieces merely add to the intensity of a resolvable element of the image 91 that is larger than the pieces of the diffraction pattern. One way of accomplishing such modulation of the beam 21 is described in *Applied Optics*, vol. 7, No. 11 (November, 1968), pages 2301–2311. This article describes the use of an intensity varying diffraction grating for the modulating structure 68 to illuminate a transparency with a wavefront with periodic variations thereacross.

In place of an intensity varying grating 68, a dispersion plate having a uniform amplitude transmission thereover and a rapidly varying phase thereacross may be utilized. As pointed out by Upatnieks in *Applied Optics*, Vol. 6, No. 11, November, 1967, pp. 1905–1910, and in his copending patent application Ser. No. 638,031, if such a dispersion plate is positioned immediately against a transparency in its illuminating light beam, the transparency is illuminated with uniform amplitude but rapidly varying phase thereacross. In the optical system of FIGS. 1 and 1A, the transparent member 29 may be modified by roughening its surface immediately against the object transparency 23. The roughened surface provides illumination of the transparency with varying phase thereacross.

Figure 1D:
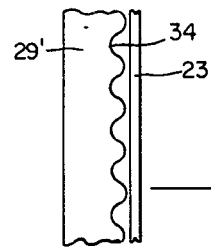

Instead of the random phase variation suggested as a specific example by Upatnieks, it is preferable to impart a periodic phase variation to the transparency illumination for the systems described herein. A random phase variation may have the disadvantage that some of the pieces of an undesirable diffraction pattern may be so large as to be resolvable by the viewing system. Referring to FIG. 1D, the optical plate 29 of FIGS. 1 and 1A is shown in partial cross-section after conversion into a dispersion plate 29' by adding to the surface thereof adjacent to the transparency 23, periodically recurring undulations 34 of a substantially uniform period of recurrence. The undulations are preferably parabolic in shape to reduce undesired light scattering but a sinusoidally varying surface is a close equivalent and perhaps more easily obtained. The optical member 29' is most conveniently constructed by plastic molding techniques.

No matter what specific type of modulating structure is utilized, the hologram aperture 45 must generally be larger than the minimum size calculated according to the considerations hereinbefore discussed. Diffraction by a modulating structure enlarges the object-modified beam 24 and thereby requires a larger hologram aperture if information of the movie frame is not to be lost and to prevent a speckled reconstructed image. Such diffraction constructs multiple holograms of the same information. Other techniques for multiple hologram construction than the diffusion (diffraction) techniques described herein may also be employed to provide the redundancy required. Such a technique, for instance, is to construct a plurality of adjacent or slightly overlapping holograms of the same information by multiple exposure.

The hologram record construction techniques described with respect to FIGS. 1 and 1A have utilized a diverging reference beam. It is generally more convenient to use a collimated reference beam in order to simplify the copying of such a hologram record and its reconstruction, as will become apparent hereinafter. The diverging reference beam example described hereinbefore provides a wavefront at the hologram detector having a radius of curvature equal to the effective distance between the object transparency and the hologram detector in order to produce a sequence of holograms which can be reconstructed without individual image motion. A collimated reference beam has a wavefront striking a hologram detector with an infinite radius of curvature. Therefore, the object transparency to be recorded must be effectively placed an infinite distance from the hologram detector in order to avoid image motion upon reconstruction of the sequence of holograms on a hologram record. Such a technique is described with respect to FIGS. 4 and 4A wherein the elements thereof which are the same as those described previously in FIGS. 1 and 1A are given common reference characters.

Figure 4:
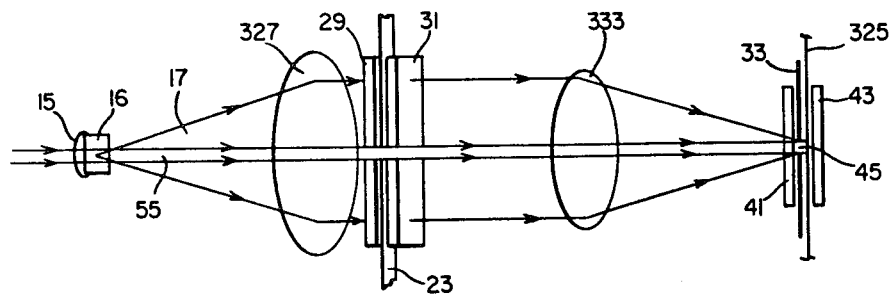
FIGS. 4 and 4A show certain modifications of FIGS. 1 and 1A.
Figure 4A:
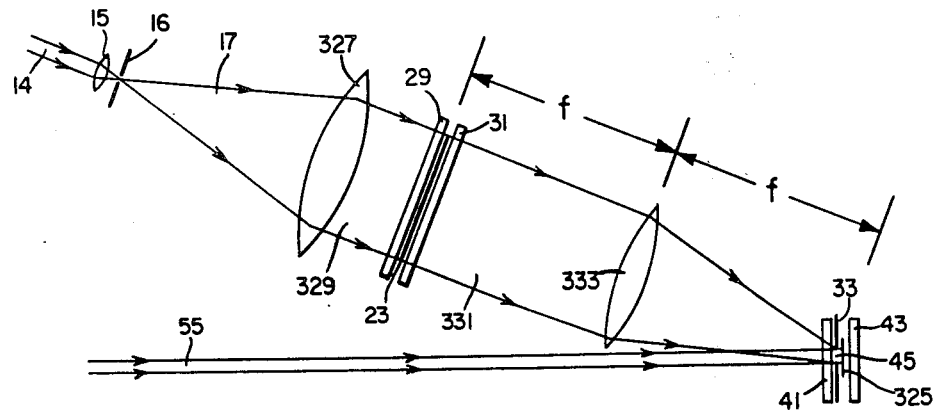

The collimated reference beam 55 of FIGS. 4 and 4A originates from the coherent light source and is directed through the hologram aperture 45 onto an elongated hologram detector 325 without curvature controlling optics placed in its path, although optical elements may be used for various reasons. The object movie transparency 23 is generally illuminated as in FIGS. 1 and 1A except that the diverging coherent beam 17 of FIGS. 4 and 4A may conveniently be passed through an optical element 327 to form a collimated light beam 329 for illuminating the movie 23, thereby producing an object modified beam 331. In order to place the object movie transparency 23 at effectively an infinite distance from the detector 325, a lens element 333 with a focal length $f$ is positioned in the object-modified beam 331. The lens 333 is positioned so that the object movie transparency 23 is located at one focal plane thereof and the hologram detector 325 is positioned in the vicinity of the other focal plane of the lens 333 such that the hologram aperture 45 of FIGS. 4 and 4A is uniformly illuminated in the absence of the transparency 23. Additionally, the aperture 45 is positioned relative to the lens 333 to capture the full converging portion of the object-modified beam 331 when the transparency 23 is removed. Such a configuration utilizes the lens 333 in performing a Fourier transform of the information contained on the object transparency 23, thereby effectively positioning the object transparency 23 an infinite distance from the hologram detector 325. The curvature of the reference beam 55 also has an infinite radius, thereby to produce a hologram record from which images may be reconstructed from sequential holograms without image movement. Mathematical details of such a hologram are given in the book *Introduction to Fourier Optics* by J. W. Goodman (McGraw-Hill, 1968), beginning at page 171. Additionally, to further minimize any possible image movement upon reconstruction, a reference beam 55 is oriented perpendicular to the hologram detector 325 in a direction of intended movement of the detector 325 upon reconstruction.

This description uses the term "effective distance" when referring to certain distances between elements of an optical configuration. As used herein, the "effective distance" between elements of an optical configuration is that actual distance that appears to exist between the elements because of some light controlling optics intermediate of the two elements whose actual physical separation is some other value.

Figure 4B:
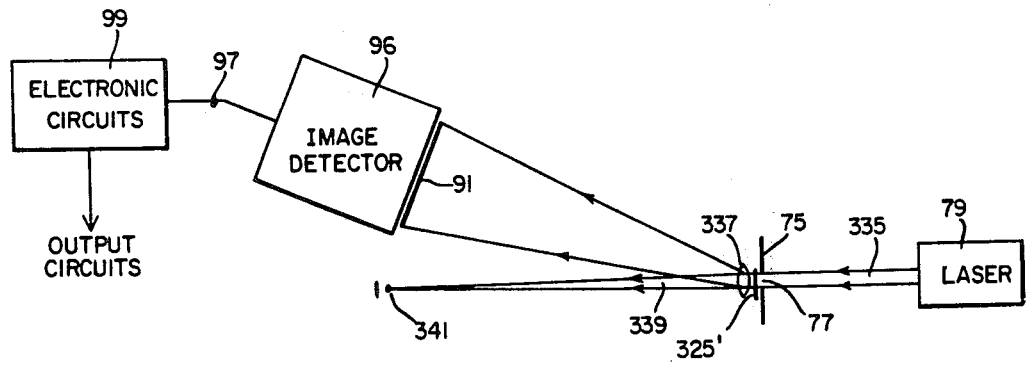
FIG. 4B shows certain modifications of FIGS. 3 and 3A.

After processing the exposed photosensitive detector 325 in an appropriate manner, an elongated hologram record 325' is preferably reconstructed as illustrated in FIG. 4B. Those elements common with the record player described hereinabove with respect to FIGS. 3 and 3A are given common reference numerals. A collimated beam 335 from the laser 79 is directed against the hologram record 325' without optical elements therein (although optics may be used) so that the record is illuminated with collimated reconstructing light. A lens 337 is positioned in a first order beam diffracted by the hologram record to reconstruct an image in real space at some finite distance from the hologram record. The lens 337 is chosen to give a magnification of the reconstructed image 91 appropriate for the particular image detector 96.

The hologram record 325' may be reconstructed with a converging light beam 87 as illustrated with respect to FIGS. 3 and 3A but it is preferred to illuminate the record itself with a collimated beam 335 as shown in FIG. 4B. This is preferred since the reference beam used in constructing the hologram record is itself collimated. Therefore, if a photosensitive detector 325 has some finite thickness (as is preferred for bright reconstructions) the Bragg condition may be more nearly satisfied upon reconstruction by a collimated beam.

The techniques described hereinabove have assumed a black-and-white photographic movie 23 as the subject for constructing the holographic record. If it is desired to use a color movie as the subject, a black-and-white copy thereof is made with white light according to the photographic techniques of contact printing. This black-and-white copy is then used as the object for construction of a holographic record according to FIGS. 1 and 1A. The reason that the color movie should not ordinarily be used directly is that the coherent light source 11 emits light of only one color which significantly distorts the color balance of a color movie used to make a holographic record directly.

In addition to using an ordinary photographic movie as the subject for a holographic record, video information stored on magnetic tape or some other medium may also be transferred to a holographic record constructed according to the techniques outlined herein by first making a black-and-white photographic movie frame by frame from the tape or some other medium through a television monitor or other signal recording means known in the art. This movie may then be used as subject of the holographic record constructed according to either the techniques illustrated in FIGS. 1 and 1A or those illustrated in FIGS. 4 and 4A.

An output signal of the apparatus illustrated in FIGS. 3 and 4B is carried by a radio frequency carrier for connection with the antenna jack of either a black-and-white or color television receiver. The material viewed on the television receiver will be that information recorded on the black-and-white ordinary photographic movie utilized as subject of the holographic record. A holographic record capable of reconstructing color information to display a color photographic movie or a television magnetic tape signal on a color television set is possible by an extension of the techniques described with respect to FIGS. 1–4B. Improvements thereon which make possible color information reconstructions from a hologram record as described hereinafter is the invention claimed in this application. Other subject matter described hereinbefore and the subject matter pertaining to making hologram copies described hereinafter is claimed in an application by Daniel S. St. John and Kenneth A. Haines entitled "Holographic Television Record System" filed concurrently herewith.

In all three alternate color methods described herein, the color information is not directly recorded onto a hologram record, as it could be according to the known techniques of color holography, but instead is processed prior to making the holographic record according to the techniques of this invention. This prior processing provides a hologram record which may be replayed on a home color television receiver with a minimum of additional apparatus. Neither complicated color separating and modulating optics nor more than one monochromatic reconstructing light source is required in the record player. The first of these alternate color techniques is illustrated with respect to FIGS. 5–7 wherein an ordinary photographic color movie is the subject of a hologram record.

Figure 5:
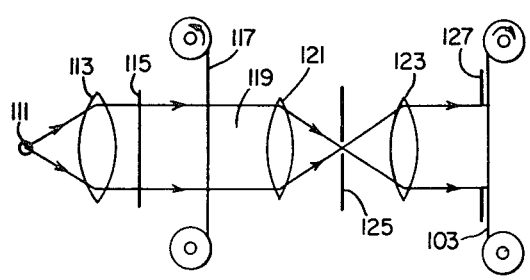
FIG. 5 illustrates a technique for constructing the color coded master transparency of FIG. 5A.
Figure 5A:
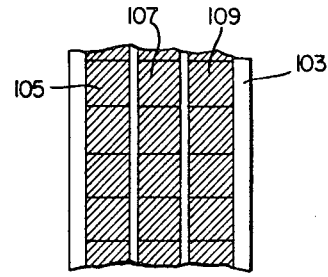
FIG. 5A shows a color coded master transparency for use in the configuration of FIGS. 1 and 1A to construct a hologram containing color information.

FIG. 5A shows a black-and-white color coded master film transparency 103 containing color information of a color movie. Each frame of the color movie is recorded on the black-and-white film 103 a total of three times; a transparency 105 recording the red information of the color movie frame, a transparency 107 recording the green information, and a transparency 109 recording the blue information. The resulting black-and-white film 103 is then used as the object transparency of the hologram record constructed according to the configuration of FIG. 1 and is substituted for the movie 23 therein.

A technique of constructing the black-and-white film 103 is illustrated in FIG. 5 where a white light source 111 emits radiation which is collimated by a lens 113 and passed through a color filter position 115 before striking the color movie 117. If a color filter placed at the position 115 allows only the red component of the white light source emission to pass through the film 117, the light beam 119 contains red information of the color film 117. The beam 119 is focused by lenses 121 and 123 onto a portion of the film 103 and recorded thereon. An adjustable aperture 125 is provided a distance equal to the focal length away from each of the lenses 121 and 123 (the frequency plane) and may be adjusted to limit the spatial frequencies recorded on the color coded film 103. Limitation of the spatial frequencies recorded on the color coded film 103 may be desired so that light is not diffracted outside the hologram aperture when the hologram record is constructed. However, if limitation of the spatial frequencies recorded on the color coded film 103 is not desired, the film 103 could be constructed according to ordinary contact printing techniques of photography.

A mask 127 is placed over the film 103 and contains an aperture positioned to limit recording red information along the left hand portion of the film 103. The color film 117 and the black-and-white film 103 are moved at a proper relative speed, or may be advanced together one frame at a time, to initially record all the red information of a color movie 117. The next step is to repeat this recordation by substituting a green for a red filter at the filter position 115 and realigning the optical elements including the mask 127 so that the green information is recorded in the middle of the film 103. Similarly, blue information is then recorded on the right hand side of the film and with the use of a blue filter placed at the position 115.

Figure 6:
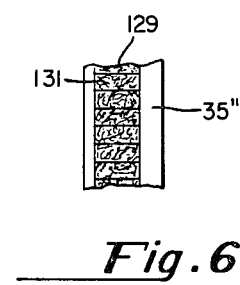
FIG. 6 is a specific form of a hologram record constructed according to the configuration of FIGS. 1 and 1A with the color coded master transparency of FIG. 5A as an object of the hologram.

When developed, the film 103 is substituted for the photographic movie 23 in the configuration of either FIGS. 1 and 1A or FIGS. 4 and 4A to make a hologram record. The aperture 45 therein may be rectangular instead of a square used hereinbefore as a convenience in construction since the information recorded on each hologram is rectangular with one dimension thereof considerably greater than the other dimension. A portion of the hologram record is shown in FIG. 6 with a row of rectangular holograms 129 just touching or slightly overlapping each other. An individual hologram 131, for instance, contains full color information of one frame of the color movie 117. The hologram 131 has been made of its red, green and blue components recorded in the intermediate step on the black-and-white film 103. Alternatively, an individual hologram may be constructed for each of the three primary color components but this is not preferred since the detector area is not efficiently utilized. Yet another alternative, which is preferred for efficient utilization of the detector area, is to construct a single substantially square hologram corresponding to each color movie frame, thereby constructing a hologram record with an appearance similar to that of FIG. 2. In order to construct square holograms according to FIGS. 1 and 1A from the horizontally elongated information bits of FIG. 5A, the optical system 19 of FIGS. 1 and 1A is provided with a cylindrical lens element (not shown) which converges the object-modified beam 24 more in the horizontal direction than in the vertical direction.

Figure 7:
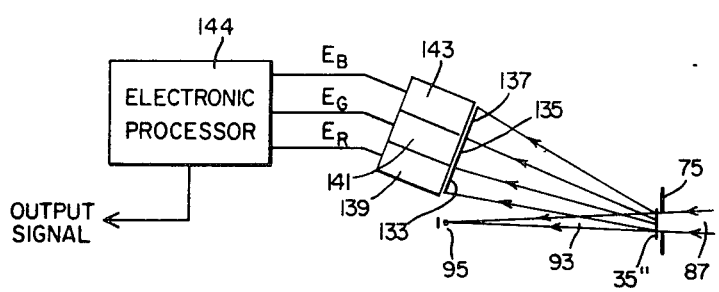
FIG. 7 illustrates the reconstruction of the hologram record of FIG. 6.

The hologram record 35" (or a record constructed according to the alternatives described hereinabove) is reconstructed by being driven at a uniform speed, as described herein with respect to either FIGS. 3 and 3A or FIG. 4B. The laser, associated optics, and preferred curvature of the reconstructed beam are the same in reconstructing the hologram record 35" as were described with respect to FIGS. 3 and 3A in reconstructing the hologram record 35' and as described with respect to FIGS. 4B in reconstructing the hologram record 325'. The hologram record 35" is shown in FIG. 7 being drawn out of the paper continuously and at a uniform speed through a monochromatic coherent light beam 87. Each hologram thereon reconstructs three monochromatic images, an image 133 containing red information of a color movie frame, an image 135 containing green information of the movie frame, and an image 137 containing blue information of the movie frame. Each image, of course, is the color of the laser light beam 87. An individual image detection tube is aligned with each of the three reconstructed images, an image detector 139 generating a time varying electrical signal $E_R$ corresponding to the red information of the color movie, an image detector 141 generating a signal $E_G$ corresponding to the green information of the color movie and an image detector 143 generating a signal $E_B$ proportional to the blue information of the color movie. These color signals are gamma corrected, appropriately added and subtracted to produce standard luminance and chrominance signals required by a color television set, and modulated onto a radio frequency carrier by an electronic processor 144 to produce an output signal which can be fed into the antenna receptacle of a home color television set. The home hologram record playing apparatus illustrated in FIG. 7 is only slightly more complex than that illustrated in FIGS. 3–3A and 4B for black-and-white images. Three images detectors are included. A single monochromatic coherent laser beam 87 is utilized for reconstructing the full color information in three distinct images as recorded on the hologram record 35". The record playing apparatus is similar to a three tube color television camera without a complicated and expensive optical system for separating a color image into its three color components. The system described herein presents to the image detecting tubes directly from the hologram record the information each tube seeks, thereby simplifying the hologram record player.

Processing image information of each color movie frame to produce a standard FCC color electronic signal from the three primary color signals as indicated in FIG. 7 to yield a signal for utilization by a color television receiver is accomplished in the electronic circuits of the record player. However, it is desired to minimize the complexity of the record player both in the required number of receiving tubes, such as vidicons, and in the amount of electronic processing required. For this reason, the image information may be processed optically or electronically prior to constructing the hologram record so that the reconstructed optical image signal presented to the record player requires only one or two detecting tubes, and after conversion into an electrical signal, requires little or no electronic processing before being received by a conventional color television apparatus.

The following specific example described with respect to FIGS. 8–12 accomplishes such signal processing optically to give a signal that can be recorded holographically and played out through a single image detecting tube. This example illustrates a second technique for constructing a hologram record capable of reconstructing full color information.

Figure 8:
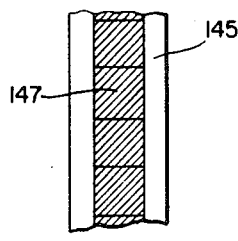
FIG. 8 shows another color coded master transparency which may be used as the object of a hologram record constructed according to FIGS. 1 and 1A.

Referring to FIG. 8, a color coded master black-and-white film 145 is constructed as the result of a series of optical processing steps. Each frame (such as frame 147) contains the processed information (signal) of a distinct single color movie frame. Each frame (such as frame 147) then becomes the object of an individual hologram of a hologram record. The frame 147 is constructed by being exposed a plurality of times to the information of a single color movie frame. During each exposure, the information is processed in a unique manner. The color picture signal M, as established by FCC standards, can be written $$M = E_Y + E_I \cos(\omega t + 33°) + E_Q \sin(\omega t + 33°) \qquad (3)$$

where
$t$ = time
$\omega$ = color subcarrier frequency (about 3.6 MHz)
$E_Y$ = luminance signal amplitude carried on a 4 MHz bandwidth
$E_I$ = I-signal amplitude carried at 1.5 MHz bandwidth
$E_Q$ = Q-signal amplitude carried at 0.5 MHz bandwidth According to the FCC standards, the following definitions apply:

$$E_Y = 0.30 \, E_r + 0.59 \, E_g + 0.11 \, E_b \qquad (4)$$
$$E_I = 0.60 \, E_{rn} - 0.28 \, E_{gn} - 0.32 \, E_{bn} \qquad (5)$$
$$E_Q = 0.21 \, E_{rn} - 0.52 \, E_{gn} + 0.31 \, E_{bn} \qquad (6)$$

where
$E_r$ = red component of the total signal,
$E_g$ = green component of the total signal,
$E_b$ = blue component of the total signal,
and the subscript $n$ refers to a narrow band-pass signal.

Since the phase of the color subcarrier must be accurately known to separate the I and Q signals, and since this requirement may be incompatible with the linearity of the horizontal sweep of the detecting tube in the record player, it may be preferred that the hologram record a modified signal M' that is still easily interpreted by the home record player in the form, $$M' = E_Y + E_I \cos \omega_I x + E_Q \cos \omega_Q x \qquad (7)$$

where
$x$ = time or horizontal distant (related by the horizontal sweep frequency)
$\omega_I$ = carrier frequency of the I-signal
$\omega_Q$ = carrier frequency of the Q-signal For optical data processing, each term of Equation (7) is expanded by substitutions therein of Equations (4), (5), and (6), in which case the signal M' is made up of $E_r$, $E_g$, and $E_b$ signals that may be obtained by color filters. The optical processor must perform the functions of adding each of the color signals in the appropriate amounts, of providing the appropriate band-pass for the I and Q signals, and must modulate the I and Q signals on their respective carriers. These carrier frequencies $\omega_I$ and $\omega_Q$ are chosen to be above the 0–4 MHz range and are separated sufficiently to avoid cross-talk. Addition of signals is accomplished by successive exposures to each color signal where the constants that are part of each such signal term are obtained by a light attenuator or by appropriate control of the exposure time. The lowpass signals are obtained with the use of appropriate spatial filters in the spatial frequency plane of the optical processor. The carrier frequency terms are obtained by the superposition of a grating having the proper spatial frequency. Negative carrier frequency terms are recorded by displacing the grating 180°. A complication occurs, however, because recording a signal through a grating records not simply the signal multiplied by $\cos \omega x$, but rather the signal mulitplied by $[½ + ½ \cos \omega x]$. That is, there is an average exposure through the grating that appears as a signal term at low spatial frequencies, in addition to the desired signal at the carrier frequency modulated with appropriate side bands. For this reason, the recording of the unmodulated $E_Y$ signal is modified so that the sum of that recording and the unmodulated components of the I and Q signals (recorded through the gratings) add up to the desired unmodulated signal. In addition, it is necessary to increase the relative strength of the $E_Y$ signal, since there can be no negative terms in the recording steps. Thus, the signal actually recorded on the film 145 may be a modified signal M'' instead of the signal M' defined in Equation (3):

$$M'' = 3E_y + ½ \, E_I \cos \omega_I x + ½ \, E_Q \cos \omega_Q x \qquad (8)$$

Compensation for the changed relative signal strengths of Equation (8) is accomplished by simple electronic circuits in the record player. FIGS. 9–11A show a specific method of recording on a frame 147 of the black-and-white film 145 the signal of a single frame of color movie 117 according to Equation (8).

Figure 9:
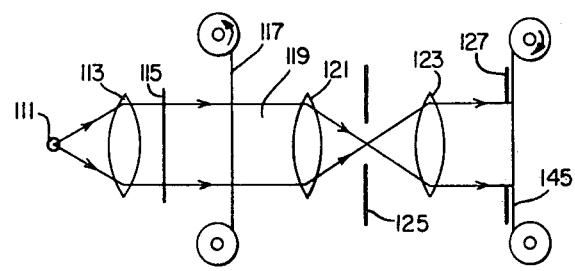
FIGS. 9 and 10 illustrate the construction of the color coded master transparency shown in FIG. 8.
Figure 9A:
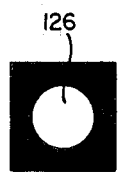
FIGS. 9A, 9B and 9C are spatial filters for use in the optical systems of FIGS. 9 and 10.
Figure 9B:
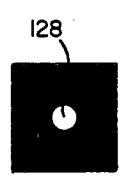
Figure 9C:
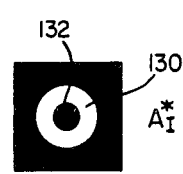
Figure 10:
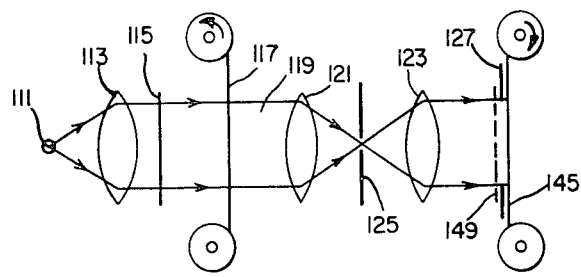

FIG. 9 shows one optical configuration for recording the unmodulated terms of Equation (8) and FIG. 10 shows a corresponding optical configuration for recording the carrier frequency terms. Elements therein corresponding with those of FIG. 5 are given the same reference numbers. The light source 111 is a balanced polychromatic one. Its output is filtered into a red, green or blue component by an optical filter placed at the plane 115. A spatial filter placed at the position 125 limits the bandwidth of the signal recorded on the film 145. The shapes of such filters are shown in FIGS. 9A, 9B, and 9C. An A filter in FIG. 9A has a hole 126 in an otherwise opaque substance to limit the unmodulated signal terms recorded to 0–4 MHz. The size hole to accomplish this depends upon the horizontal line scan frequency of the detector tube, and upon the wavelength or color of light used in the signal processor. An $A_I$ filter of FIG. 9B has a smaller hole 128 for recording the narrower bandwidth I-signal terms. An $A_Q$ (not shown) filter is similar to the $A_I$ filter of FIG. 9B but has an even smaller opening reflecting the smaller bandwidth of the Q-signal terms. An $A_I^*$ filter, shown in FIG. 9C, has an annular hole 130 to provide a band-pass between that of the I-signal and 4 MHz. The annulus has an outer diameter equal to that of the A filter, and a dark spot 132 in the center with a diameter equal to that of the hole 128 in the $A_I$ filter. Similarly, an $A_Q^*$ filter (not shown) has an annular hole to provide a band-pass between that of the Q-signal and 4 MHz. In practice, the filters should be apodized, that is, should have slightly blurred edges so that distracting diffraction patterns from sharp edges thereof can be avoided. Thus, the A, $A_I$, and $A_Q$ filters can be made photographically as negative transparencies of slightly out of focus black circles on a white background. The $A_I^*$ and $A_Q^*$ filters could be a combination of a negative transparency of the $A_I$ or $A_Q$ filter together with the A filter.

Figure 11:
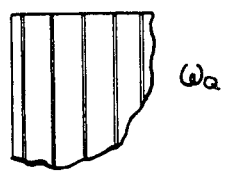
FIGS. 11 and 11A show two spatial modulating gratings used in the configuration of FIG. 10.
Figure 11A:
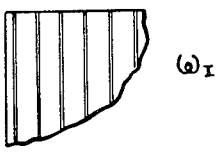
Figure 13:
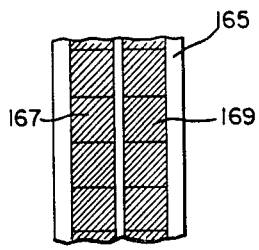
FIG. 13 shows yet another color coded master transparency.

A grating is placed at a grating position 149 of FIG. 10 to modulate the I and Q signal terms of Equation (8) onto carrier frequencies. As shown in FIGS. 11 and 11A, the grating used to record the $\omega_Q$ terms has a lower frequency than the grating used to record the $\omega_I$ terms. This accomplishes a modulation of the I and Q signals onto independent carrier frequencies. These gratings are provided with a sinusoidally varying transmission at the desired frequency. The gratings are most easily constructed by exposing photosensitive sheet elements used for each of 15 exposures to record a single frame 147 of the color-coded master film 145.

| Exposure No. | Relative transmission at the plane 115 | Color filter at the plane 115 | Spatial filter at the plane, 125 | Grating at the plane 149 | Phase position of the grating used |
|---|---|---|---|---|---|
| 1 | 0.60 | Red | $A_I$ | $\omega_I$ | 0° |
| 2 | 0.28 | Green | $A_I$ | $\omega_I$ | 180° |
| 3 | 0.32 | Blue | $A_I$ | $\omega_I$ | 180° |
| 4 | 0.21 | Red | $A_Q$ | $\omega_Q$ | 0° |
| 5 | 0.31 | Blue | $A_Q$ | $\omega_Q$ | 0° |
| 6 | 0.52 | Green | $A_Q$ | $\omega_Q$ | 180° |
| 7 | 0.495 | Red | A | none | none |
| 8 | 0.30 | Red | $A_I{}^*$ | none | none |
| 9 | 0.105 | Red | $A_Q{}^*$ | none | none |
| 10 | 1.37 | Green | A | none | none |
| 11 | 0.14 | Green | $A_I{}^*$ | none | none |
| 12 | 0.26 | Green | $A_Q{}^*$ | none | none |
| 13 | 0.015 | Blue | A | none | none |
| 14 | 0.16 | Blue | $A_I{}^*$ | none | none |
| 15 | 0.155 | Blue | $A_Q{}^*$ | none | none | material to two interfering coherent light beams which intersect at a finite angle therebetween at the photosensitive material. This angle and the light wavelength are chosen to produce a grating with the desired frequency of transmission variation.

When used in the configuration of FIG. 10, the gratings $\omega_Q$ and $\omega_I$ are positioned at the plane 149, as shown, which is very close to the film 145, or may be imaged onto the film 145 from some other position. Once the transmission variation pattern of each of these filters is established for one exposure of a given area of the film 145, it must be maintained relative to the film for all subsequent exposures of that same area. However, for negative carrier frequency terms, a grating is shifted from this position relative to the film 145 in an amount equal to one-half the grating transmission variation period, (that is, shifted 180°).

These elements described with respect to FIGS. 9–11A are utilized to complete the single frame 147 of the color coded master film 145 by a series of exposures. In order to understand these exposures more readily, Equation (8) can be written in the following equivalent form:

$$M'' = [3E_y - \tfrac{1}{2}|E_r| - \tfrac{1}{2}|E_a|]$$
$$+ [\tfrac{1}{2}|E_I| + \tfrac{1}{2} E_I \cos \omega_I x]$$
$$+ [\tfrac{1}{2}|E_Q| + \tfrac{1}{2} E_Q \cos \omega_Q x] \quad (8a)$$

Figure 12:
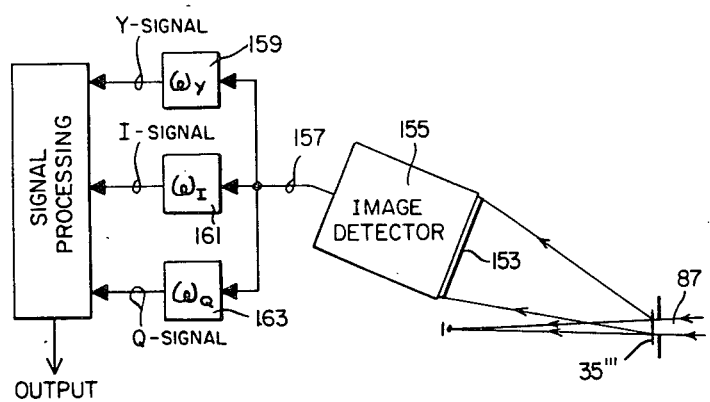
FIG. 12 illustrates the reconstruction of a hologram record made with the color coded master transparency of FIG. 8 as an object thereof.

The signal term denoted between vertical bars, such as $|E_I|$, is the $E_I$ as defined in Equation (5) with the (−) signs before the $E_{gn}$ and $E_{bn}$ terms replaced by (+) signs. In Equation (8a), the desired unmodulated component $3E_Y$ is corrected by subtracting signals equivalent to the unmodulated components introduced by the optical recording of the modulated $E_I$ and $E_Q$ signals. Since only positive exposures are possible in sequential optical data processing, the subtraction of a low frequency component such as the red signal component in $E_I$ from a full bandwidth red component $E_Y$ is accomplished by reducing the amplitude of the full bandwidth component and adding only the high frequency component (above the I bandwidth) with the filter $A_I{}^*$. The following table illustrates the various combinations of Each frame of the color film 117 is similarly exposed onto the black-and-white photographic color coded master film 145. After processing, the film 145 then becomes the subject of the hologram record by replacing the movie film 23 in the configuration of either FIGS. 1–1A or FIGS. 4–4A. A hologram record 35''' is a result, and is reconstructed as illustrated in FIG. 12. A hologram record is driven at a uniform speed and is illuminated from a low power effectively continuous waver laser as shown in FIGS. 3–3A for generation of a real space holographic image 153. A single image detector 155 is positioned to receive this image. The electrical output 157 of the image detector derived from scanning the image 153 in an appropriate raster is then broken down into its components by three electronic filters. A low-pass filter 159 suppresses the two chrominance signals modulated at 5.0 MHz and 7.0 MHz to negligible levels but allows the luminance signal carried below 4 MHz to pass. A band-pass filter 161 is tuned around the 5.0 MHz frequency at which the chrominance Q-signal of the color film frames was modulated, while significantly attenuating the chrominance I-signal and the luminance signal to negligible levels. A band-pass filter 163 is tuned around the 7.0 MHz frequency at which the chrominance I-signal of the color film frames was modulated while supressing the chrominance Q-signal and the luminance signal. The three signals are then processed by modulating the I and Q signals onto a color subcarrier and mixing with the Y signal to produce the standard FCC signal M as defined in equation (3). The signal M so developed may be fed directly into a color television receiver but, more conveniently, may be modulated onto a radio frequency carrier for connection to a television set through its antenna receptacle.

It should be noted that the processing of the color information into the luminance and two chrominance signals required to drive a standard color television receiver has been accomplished optically prior to constructing the hologram record. The signal processing electronics of the record player need not include a capability of combining color signals or color difference signals to derive the required luminance and chrominance signals. Therefore, the record player is simplified even more.

The single image detection tube method of reconstructing movie information from the holographic record as described hereinabove generally provides a very simple home holographic record player. A significant advantage of the one image detector method over the three image detector method described herein is a lack of necessity for precise matching of image detector raster scanning patterns and for provision for continual adjustment of the individual raster scanning patterns.

However, a one image detector method suffers from some disadvantages. The high spatial frequencies at which the color information is modulated produces a total signal having a bandwidth larger than that which may be carried by a simple optical system and further includes spatial frequencies above that which may be resolved by some image detectors commercially available. As an alternative, the two chrominance components can be carried within the 0–4 MHz luminance signal bandwidth, for example around 0.5 MHz and 1.5 MHz, but this presents severe electronic processing problems in separating the three signals without cross-talk between them.

It has been found that a two image detector readout system is an optimum compromise which allows use of standard image detectors and optical systems. The maximum bandwidth capability required of the optical system in the two image detector system of this invention is the same as that required for the luminance information. Cross-talk between luminance and color signals is avoided by carrying each on separate channels. Precise alignment of reconstructed images with the raster scanning patterns of the two image detectors is unnecessary with the system of this invention described hereinafter since the human eye cannot detect slight mismatches in overlaying the color image detected by one image detector and the luminance image detected by the second image detector. Additionally, provision for continual adjustment of the individual raster scanning patterns to maintain such alignment is not required. This third technique of making a color holographic record is described with respect to FIGS. 13–17.

A color coded black-and-white transparency is first made from the color movie to be recorded. This black-and-white color coded master film 165 of FIG. 13 contains two adjacent frames for each color film frame, such as a frame 167 for luminance information of a color film frame and a frame 169 containing color information thereof. The luminance image 167 is recorded by a technique similar to that shown in FIG. 9 wherein the film 165 replaces the film 145 therein. A frame of the color film 117 is illuminated with white light with the spatial filter 125 opened wide enough to allow a 4 MHz bandwidth to pass and to be recorded as an image 167. Three exposures of the film area 167 will normally be made, one each with a red, green and blue color filter positioned at the plane 115.

Figure 14A:
FIGS. 14A, 14B and 14C show individual spatial modulating gratings for each of the primary colors which are used in constructing the color coded master transparency of FIG. 13.
Figure 14B:
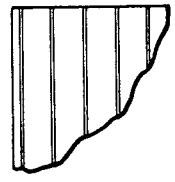
Figure 14C:
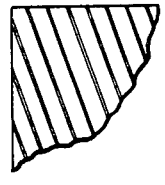
Figure 15:
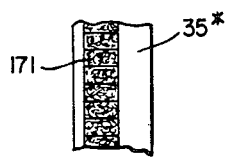
FIGS. 15 and 16 show alternate hologram records constructed according to FIGS. 1 and 1A from the color coded master transparency of FIG. 13.

The color information image 169 of a frame of the color film 117 is recorded by multiple exposures thereof to blue, red and green signal components of the color film frame information to record a signal of the form:

$$S = Y_s + 0.3 E_r \cos \omega_r t + 0.59 E_g \cos \omega_g t + 0.11 E_b \cos \omega_b t$$
where $Y_s = 0.3 E_r = 0.59 E_g + 0.11 E_b$ The red, green and blue exposures may be made individually one at a time according to the techniques illustrated in FIG. 10. The first exposure is made with a blue color filter at the color filter position 115 and a sinusoidally intensity varying grating 149 that takes on the form illustrated in FIG. 14A. The exposure is made at a relative strength of 0.11 by appropriate adjustment of the exposure time or by the use of an appropriate neutral density filter. The second exposure of a given color film frame is made wih a relative strength of 0.3 and with a red color filter at the plane 115 and a sinusoidally intensity varying grating 149 which appears as shown in FIG. 14B. The third exposure of the area 169 of the film 165 is accomplished with a relative strength of 0.59 and with a green filter at the filter plane 115 and a grating 149 which looks like that shown in FIG. 14C. As explained hereinbefore, each such exposure of the film 165 impresses thereon not only the color signal modulated onto the desired carrier frequency but also an unmodulated low frequency signal of equal strength. Therefore, the summation of the three color exposures provides in addition to the three modulated color signals, an unmodulated signal just equal to the luminance signal $Y_s$ carried with a limited bandwidth equal to that employed for the individual color signals.

As a specific example, advantage may be taken of the fact that most color television receivers in the U.S. are designed to accept color signals only to a bandwidth of 0.5 MHz, instead of the wider bandwidth specified in the FCC Broadcast Standards. Thus each of the three color signals can be limited by the aperture 125 to a spatial resolution corresponding to 500 MHz and the period of intensity variation of the grating shown in FIGS. 14A, 14B, and 14C, may be such that the blue signal is modulated at a frequency of 1.5 MHz when scanned in a raster pattern by an image converter. Similarly, the red signal is modulated at a frequency of 2.5 MHz and the green signal at 3.5 MHz. The $Y_s$ signal appears in the band 0 to 0.5 MHz and the entire color signal is thus carried within the 4 MHz bandwidth capability utilized in the high resolution luminance frame 167. It may be noted further that these carrier frequencies are chosen so that the sum or difference between any two of them avoids the third frequency, thereby avoiding any substantial cross talk between the three color signals. Cross talk may further be made less objectionable to the observer by orienting the three gratings at appropriate angles with respect to the image so that the grating lines are not parallel with prominent lines found in a typical image scene. Having the gratings oriented in different directions with respect to the image has the further advantage that the dynamic range of the recording material is better utilized. All three color signals are modulated onto carriers rather than carrying one signal unmodulated, in order to avoid cross talk between the unmodulated color signal and the unmodulated or low frequency components introduced in the recording of each modulatd color signal. Thus, each of the three color signals can be derived independently without the necessity of obtaining one of them by difference between two other signals.

After the black-and-white film 165 is exposed in this manner to all frames of the color film 117, it is developed in the normal manner and a hologram record is made thereof by the techniques illustrated in either FIGS. 1–1A or FIGS. 4–4A with the film 165 substituted for the movie 23. A single hologram, such as a rectangular hologram 171 in FIG. 15, may be constructed for each color film frame. That is, the hologram 171 is constructed of an object consisting of the luminance information transparency 167 and the color information transparency 169 of a single color film frame which are horizontally adjacent to each other. A rectangular shaped hologram is the most convenient to construct since the object transparency is rectangular. However, more efficient use of the hologram detector may be had by including a cylindrical optical element in the optical system 19 of FIG. 1–1A (not shown) for converging the object modified beam 24 more in a horizontal direction than in a vertical direction, thereby making it possible to construct a hologram record which appears as in FIG. 2 having substantially square individual holograms.

Figure 16:
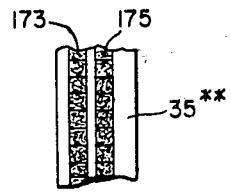

Alternatively, a holographic record illustrated in FIG. 16 may be constructed according to the techniques illustrated in either FIGS. 1–1A or FIGS. 4–4A wherein a row 173 of touching or overlapping holograms records only luminance information of successive frames of the color film while a distinct and spatially separate row 175 of holograms records only color information of adjacent color film frames. Maintaining the luminance and color information in a holographic form separate and distinct as shown in the hologram record of FIG. 16 may be desired in certain circumstances. It may be desired for complete compatibility with a black-and-white hologram record player which would then read out only that column of holograms containing luminance information.

Either of the holographic records 35* or 35** is reconstructed by a preferred holographic record player shown schematically in FIG. 17. The holographic record 35* is transported at a uniform speed through a converging coherent light beam 87 in the manner shown in FIG. 3. Referring again to FIG. 17, a pair of monochromatic images is reconstructed in a diffracted light beam, a luminance signal image 17 and a color signal image 179. Two raster scan type image detecting tubes 181 and 183 are positioned to receive, respectively, the luminance signal 177 and the color signal 179. The time-varying electrical signal output of the color signal image detecting tube 183 is presented to four electronic filters to separate the four signals originally recorded on the area 169 of the color coded monochromatic transparency. A low-pass filter 185 allows a low bandwidth luminance signal $Y_s$ only to pass therethrough by cutting off all signals above about 0.5 MHz. Alternatively, a low bandwidth luminance signal $Y_s$ could be derived by the addition of the three color signals, $0.3 E_r$, $0.59 E_g$ and $0.11 E_b$. A band-pass filter 186 has a maximum transmission about the blue carrier frequency of 1.5 MHz. A band-pass filter 187 has a maximum transmission about the red carrier frequency of 2.5 MHz. A band-pass filter 188 has a maximum transmission about the green carrier frequency of 3.5 MHz. The constants preceding the quantities $E_r$, $E_g$ and $E_b$ as noted on FIG. 17 at the outputs of band-pass filters 186, 187 and 188 may be provided by such relative attenuation in each of the three signals either electronically in the player of FIG. 17 or optically during construction of the color coded master transparency 165 of FIG. 13. The sum of the quantities $0.3E_r$, $0.59E_g$ and $0.11E_b$ will be recognized as the FCC luminance signal.

The narrow bandwidth luminance signal $Y_s$ at the output of the low pass filter 185 of FIG. 17 is mathematically divided into a narrow bandwidth luminance signal $Y_L$ by an appropriate electronic circuit 189. The signal $Y_L$ is derived from the broadband luminance electrical signal $E_Y$, which is the output of the image detecting tube 181, by passing $E_Y$ through a 0–0.5 MHz low pass filter 190 similar to the low pass filter 185.

Each of the color signals at the outputs of the filter 186, 187 and 188 are multiplied by the $Y_L/Y_s$ signal output of the divider 189 in a matrix circuit 191. The normalized color signals produced by the matrix 191 plus the broadband luminance signal $E_y$ are fed into a standard FCC encoder 192. An FCC color signal output of the encoder 192 is then modulated onto a radio frequency carrier for insertion into a color television set through its antenna receptacle.

The normalizing feature of the record player as shown in FIG. 17 compensates for differences in sensitivity between the image detecting tubes 181 and 183 and for other differences between the two signal channels. A greater freedom in selecting such tubes results. This feature is the reason for developing all three color signals and a narrow bandwidth luminance signal as well as an independent broadband luminance signal, although there is a certain redundancy of information carried thereby. Also, the normalizing feature is the reason for not carrying the chrominance Q-signal and I-signal to the image detector 183, as could be done by proper optical processing prior to making the hologram record as described hereinbefore with respect to the single image detector method.

As an alternative to producing a radio frequency color signal output, the normalized color signals at the output of the matrix 191 may be used directly in a distinct electronic circuit to obtain color difference signals required by a color television tube. This latter alternative is preferred when the record player is built into a color television set and its output signal may be inserted internal of its antenna jack.

Some color television cameras do not carry separately all three color signals, contrary to the system of FIG. 17. However, these systems require complicated circuits for deducing the missing color from the other two color signals and the luminance signal. The signal processing illustrated in FIG. 17 makes such deductive circuits unnecessary yet does not require three or four vidicon tubes and the attendant problems in registering images thereon.

The two-channel system described with respect to FIGS. 13–17 may be modified as shown in FIGS. 18 and 19 to provide for a more compact record player and reduced angle $\theta$ between the reference beam and object modified beam during the hologram construction. FIG. 18 shows a color coded film transparency 165' that is the counterpart of the transparency 165 of FIG. 13. The luminance signal 167 of a single color movie frame is recorded above the spatially modulated color signal 169 on the transparency 165' rather than beside each other. An individual hologram is constructed from each pair of such signals generally according to the techniques shown in FIGS. 1 and 1A except that a cylindrical optical element is preferred as part of the optical system 19 to compress the object modified beam 24 more in the vertical direction than in the horizontal direction in order to fill a substantially square hologram aperture 45. A hologram record 170 results which has an appearance like the record shown in FIG. 2.

The hologram record 170 is reconstructed in an apparatus similar to that described with respect to FIG. 17 except that the image detecting tubes 181 and 183 are stacked one on top of the other, as shown in FIG. 19. The reconstructed luminance image 177 and the color information image 179 are stacked together in a direction of movement of the hologram 170 because of the arrangement of the signals 167 and 169 as an object of the hologram.

Another modification in the two image detecting tube embodiment of this invention is to rotate 90° the chrominance image signal 169 on the color coded transparencies 165 and 165' from that discussed hereinabove. This also requires that the modulating structures of FIGS. 14a, 14b and 14c be rotated 90° during construction of the color information signal images such as the image 169. The chrominance detecting tube 179 of FIGS. 17 and 19 is also rotated 90°. The advantage of these modifications is that the width of the string of individual holograms may be reduced, if desired. These modifications are especially desirable when the two channels are holographically recorded independently of each other as described with respect to FIG. 16 since each hologram of the row 175 of bandwidth limited color information holograms can be made much narrower than its dimension along the length of the elongated hologram without reducing reconstructed image resolution.

The single detecting tube system and the two tube system have been described with reference to FIGS. 8–12 and FIGS. 13–19, respectively, wherein the color signal has been processed optically prior to constructing the hologram record. This processing may, alternatively, be accomplished electronically. A two image detecting tube system utilizing electronic color signal processing in the construction of a hologram record is described herein with reference to FIGS. 20 and 21. Additionally, this system provides for recording a chrominance signal on a hologram record to be played on a two image detecting tube record player that may be even less complex than that described hereinbefore with respect to FIG. 17.

Present color television practice limits the bandwidth of the chrominance signal to 0.5 MHz. Therefore, the color signal developed by the holographic record player need only have this bandwidth. Such a narrow band chrominance signal has the form $(E_{rn} - E_{Yn}) \cos \omega_s t + (E_{bn} - E_{yn}) \sin' \omega_s t$, where $\omega_s$ is the carrier frequency. A separate holographic recording channel, including its own image detecting tube, is utilized to carry this signal plus a clock signal of frequency $\omega_c$ and amplitude C. The composite narrow bandwidth chrominance signal may be expressed as follows:

$$S_L = (E_{rn} - E_{yn}) \cos \omega_s t + (E_{bn} - E_{yn}) \cos \omega_s t + C \cos \omega_c t \qquad 9.$$

The second holographic recording channel, including its own image detecting tube, is utilized to carry a wide bandwidth luminance signal $E_y$. Such a two channel technique provides a color television set with only the video information it needs and no more.

Figure 20:
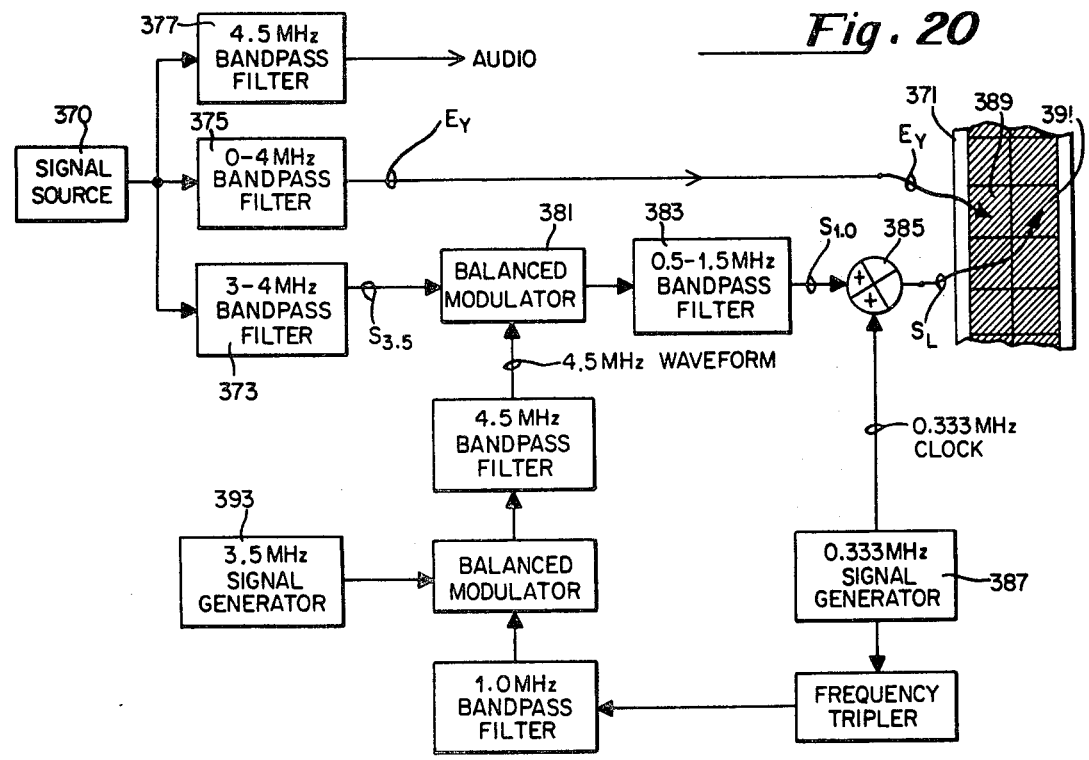
FIG. 20 is a diagram of a two channel hologram record construction technique utilizing electronic data processing.

Although such a signal as expressed in equation (9) may be optically processed from each individual color movie frame and recorded on a color coded monochromatic transparency to serve as a hologram object, as hereinbefore, it may be more convenient to use electronic processing. Existing color television equipment may then be utilized to some extent. Referring to FIG. 20, a technique is described whereby a standard TV signal from some available source 370 is electronically processed and recorded on a black-and-white color coded transparency 371. The signal source 370 includes color television equipment presently in use such a color video tape recorder. The color coded transparency 371 is utilized, similar to other embodiments described hereinabove, as the subject transparency in constructing a hologram record according to the general methods described with respect to FIGS. 1–1A or FIGS. 4–4A.

The standard TV signal input to the electronic processor of FIG. 20 will include a narrow band chrominance signal modulated onto a standard color sub-carrier near 3.5 MHz, a broad band luminance signal carried in the 0–4 MHz range and an audio signal modulated onto a 4.5 MHz carrier. This signal is separated into these three components by parallel connected band-pass filters 373, 375 and 377. The output signal of the 3–4 MHz filter 373 is a double side band 0.5 MHz bandwidth chrominance signal on a 3.5 MHz carrier, denoted as $S_{3.5}$. The output signal of the 0–4 MHz filter 375 includes both the chrominance $S_{3.5}$ signal and the broad band luminance signal, denoted as $E_Y$. The chrominance signal $S_{3.5}$ changes phase in each successive field, thereby minimizing objectionable degradation of the luminance signal $E_y$, since two successive fields are both recorded on a single frame 389.

The signal output of the filter 377 is the audio information modulated on a 4.5 MHz carrier which may be recorded on a monochromatic film transparency for holographic recording by the methods described hereinafter, or may be recorded on the hologram record by some other appropriate technique.

The chrominance signal $S_{3.5}$ output of the filter 373 is reduced in frequency in a balanced modulator 381 by beating therewith a 4.5 MHz waveform and selecting by a band-pass filter 383 the difference chrominance signal $S_{1.0}$. The chrominance signal $S_{1.0}$ contains the same information as the signal $S_{3.5}$ but is now centered about a lower carrier frequency, 1.0 MHz. The signal $S_{1.0}$ is then mixed in an appropriate circuit 385 with a 0.333 MHz clock signal derived from a signal generator 387. The circuit 385 has as an output the desired signal $S_L$ as defined in equation (9) wherein the chrominance carrier $\omega_s$ is 1.0 MHz and the clock signal frequency $\omega_c$ is 0.333 MHz. The chrominance signal $S_L$ is optically recorded on a frame by frame basis on the film transparency 371. Similarly, the luminance signal $E_y$ recorded on a frame by frame basis on distinct areas of the film 371. For instance, a given frame of color information existing within a given increment of time in the standard TV signal from the source 370 (which may correspond to a single frame of a color movie) is recorded on the film 371 with its luminance component at an area 389 and its chrominance component at an area 391. Translation from the electronic signal shown herein into the optical domain may be accomplished by any one of several known techniques. For instance, the signals $E_Y$ and $S_L$ may drive cathode ray tubes from which the film 371 is exposed. An another possible alternative, the film 371 could be scanned directly by a narrow beam of light or other energy which brings about optical changes therein.

The 4.5 MHz waveform is derived for use in the balanced modulator 381 from a combination of the clock signal generator 387 and an accurate 3.5 MHz signal generator 393 through a combination of known electronic elements shown in FIG. 20.

Figure 21:
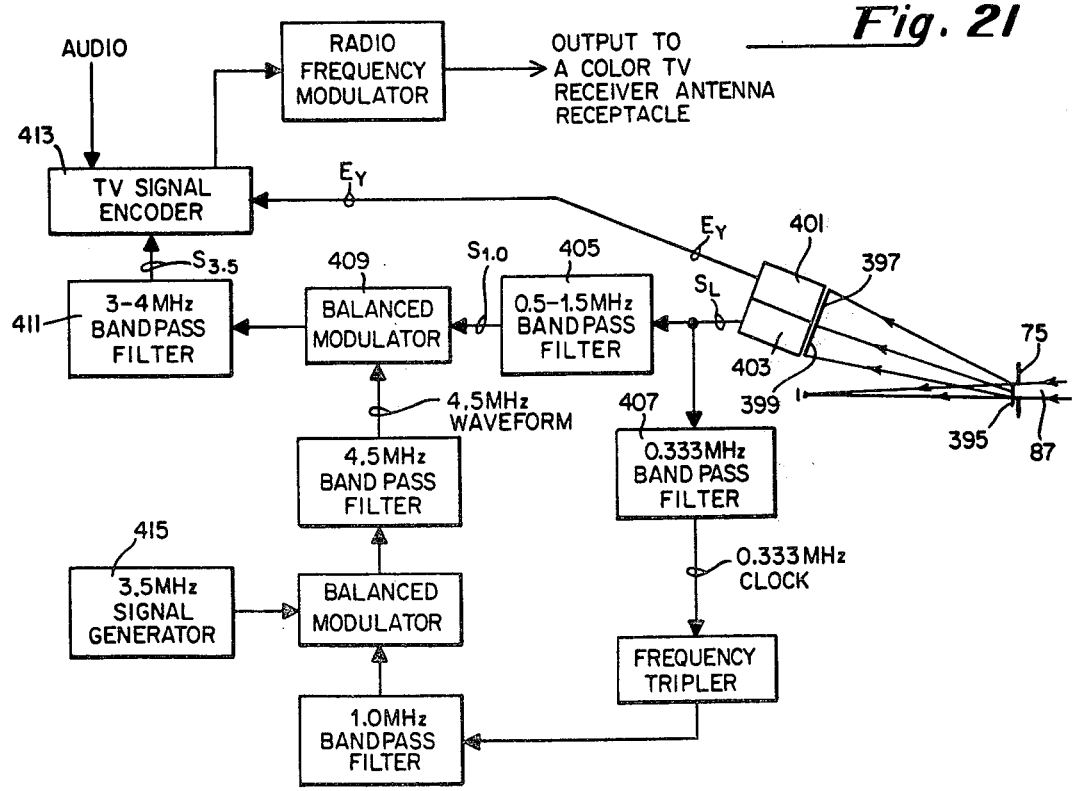
FIG. 21 shows the reconstruction of a hologram record constructed by the techniques illustrated in FIG. 20.

A hologram record 395 constructed from the color coded monochromatic transparency 371 according to either the techniques of FIGS. 1–1A or FIGS. 4–4A, is reconstructed in a record player shown in its essential elements in FIG. 21. The hologram record 395 is drawn through the reconstructing beam 87 behind an appropriate aperture containing mask 75. Each small hologram on the record 395 diffracts the coherent reconstructing light 87 in a manner to form two optical images 397 and 399. The image 397 is a broad band luminance signal corresponding to that recorded from a frame of color information such as that, for instance, on the area 389 of the color coded transparency 371. The image 399 contains a chrominance information of a frame of color information such as that, for instance, recorded on the area 391 of the transparency 371. An image detecting tube 401 is positioned to receive the image 397 and convert it to an electrical signal. Similarly, a second image detecting tube 403 converts the image 399 into the chrominance electronic signal $S_L$. The signal $S_L$ is separated by band-pass filters 405 and 407 into the narrow band chrominance signal $S_{1.0}$ and the 0.333 MHz. clock signal. The chrominance signal $S_{1.0}$ is shifted from its 1 MHz carrier frequency by a balanced modulator 409 wherein the signal $S_{1.0}$ is beat against a 4.5 MHz waveform. A band-pass filter 411 selects that chrominance signal produced by the modulator which is carried by a 3.5 MHz carrier. The luminance signal $E_y$ and the chrominance signal $S_{3.5}$, as well as a reconstructed audio signal modulated on a 4.5 MHz carrier, are all mixed in a standard TV signal encoder 413. The output of the encoder is radio frequency modulated so that the record player as a unit has an output signal compatible with a color television set and which may be received thereby through its antenna receptacle.

The 4.5 MHz waveform which is mixed within the balance modulator 409 with the chrominance signal $S_{1.0}$ is produced by the 0.333 MHz clock signal which is tripled and then beat against an accurate 3.5 MHz signal, for example, developed by a quartz signal generator 415. The clock signal thereby serves as a frequency reference which compensates in the circuit of FIG. 21 for any frequency shifting of the signal by the optical elements, especially that caused by non-linearities of the image detecting tube 403. If such optical elements undesirably shift the frequency of the chrominance signal $S_L$, the frequency of the clock signal will also be changed a proportional amount, thus modifying the frequency of the nominally 4.5 MHz waveform as introduced into the balanced modulator 409. The frequency difference between this nominally 4.5 MHz waveform and the carrier frequency of the signal $S_{1.0}$ will remain substantially constant at 3.5 MHz. Therefore, the chrominance signal $S_{3.5}$ is maintained about a substantially constant 3.5 MHz carrier.

The color holographic record recording and replay system described with respect to FIGS. 20 and 21 has the advantage that the only signal processing required is a simple shifting of chrominance signal carrier frequencies. The 3.5 MHz carrier frequency of the chrominance signal found in a standard TV signal is reduced to a 1.0 MHz frequency in order to reduce the bandwidth capabilities required of the optical elements, including that of the image detecting tube 403 of the record player of FIG. 21. The bandwidth of the chrominance signal is less than 1.5 MHz, which is about 100 lines across a vidicon or other raster scanning device used as the image detecting tube 403. Since only one chrominance carrier and a clock carrier are superimposed to form the optical signal recorded on the film 391 and holographically recorded on the record 395, the dynamic range required of the optical system is maintained at a minimum.

Figure 22A:
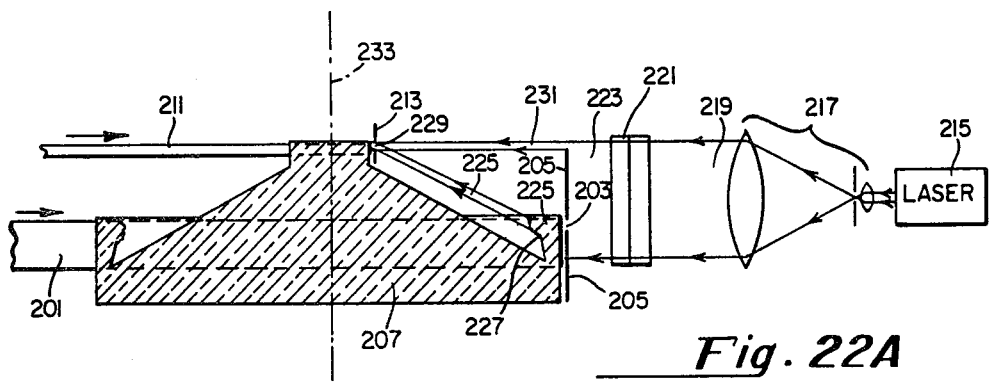
FIG. 22A shows a cross-sectional view of the apparatus of FIG. 22 along the line 22A-22A.
Figure 22:
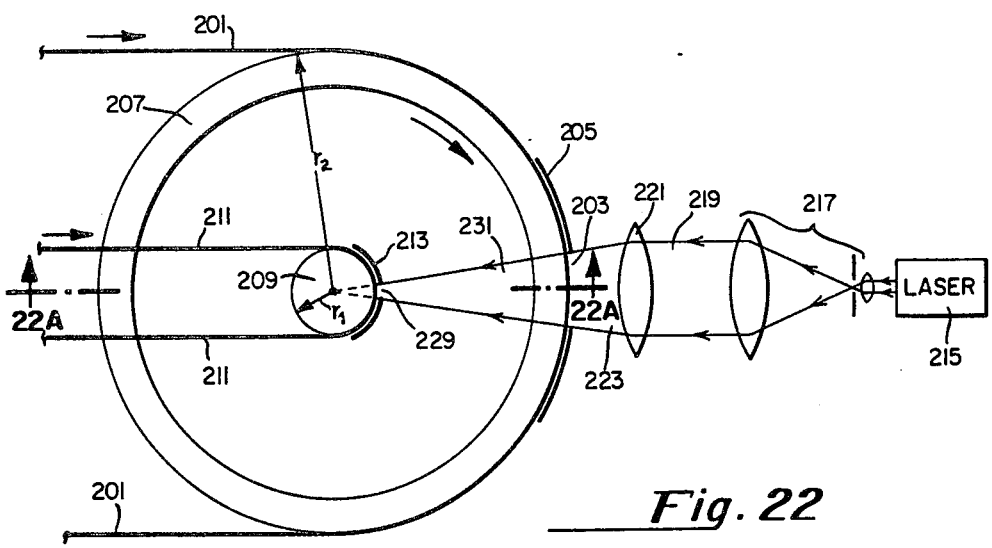
FIG. 22 schematically illustrates in one view an apparatus for constructing a holographic sound track on the hologram record.
Figure 22B:
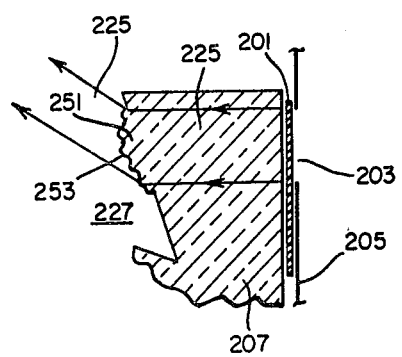
FIG. 22B shows a portion of the apparatus of FIGS. 22 and 22A with an enlarged scale.

The description of the preferred embodiments of the present invention have been concerned with making a holographic record of video information. To this record may be added audio information by any one of several techniques. For instance, known techniques of magnetic tape recording may be adapted for use on the hologram record by attaching thereto a strip of magnetic material. Other known conventional methods may be utilized but a technique for holographically recording continuous sound information as described herein is preferred since good quality sound may be reproduced thereby at the slow hologram record speed made possible by the holographic video technique. Furthermore, a holographic sound track allows mass producing copy holographic records in a single step with both video and sound information recorded thereon. Referring to FIGS. 22, 22A and 22B, a specific method and apparatus is illustrated for holographically recording sound information from a light modulated sound track of an ordinary photographic movie onto a thin strip of the hologram record. Continuous sound holographic construction and reconstruction as described herein is described more generally and claimed by Daniel S. St. John in a patent application filed concurrently herewith and entitled "Continuous Holographic Information Recording."

The sound track of a photographic movie film is two-dimensional and continuously recorded as transparency or width variations along the length of the film. It is desired to compress this sound information into a strip on the holographic record which is only a fraction of the length of the movie sound track. This is accomplished by a preferred specific method of holographic recording wherein both the movie sound track and an elongated hologram detector are driven in a direction along their lengths in arcuate paths about a common axis of curvature, and are illuminated with coherent light wavefronts with a center of curvature located substantially at the common axis. Referring to FIGS. 22 and 22A, an ordinary photographic movie film 201 has its sound track illuminated with coherent illumination through an aperture 203 of an opaque mask 205. The movie film 201 is driven past the aperture 203 in engagement with a driving wheel 207 that is symmetrical about an axis of rotation 233. A hub 209 formed on the wheel 207 carries the holographic record detector 211 past an opaque mask 213 with an aperture 229 at a speed that is a fraction of the linear speed of travel of the movie film 201 through the aperture 203, this fraction being equal to radii ratio $r_1/r_2$.

If continuous wave light illumination is desired, a coherent light wavefront illuminating the movie film sound track through the aperture 203 should have the same phase at all points thereacross in the direction of film travel. Similarly, a coherent reference beam light wavefront illuminating the hologram detector through the aperture 229 should have the same phase at all points thereacross in the direction of hologram detector travel. If these limitations are satisfied within a small fraction of one wavelength of light, the wheel 207 may be rotated to give the movie sound track and the hologram detector motion relative to the coherent illumination beams during an exposure without hologram fogging. To state the requirement in another way, these illumination beams should have centers of curvature coincident with the axis of rotation 233 of the wheel 207 within a small fraction of one wavelength of light. This focus may be a point, line or any intensity distribution therebetween. This light wavefront curvature may be provided for both beams by a single lens, spherical or cylindrical, or by individual lenses for each controlled beam.

In one convenient illumination configuration illustrated in FIGS. 22 and 22A, a laser 215 emits a narrow coherent light beam which is expanded, by an optical sub-system 217 made of conventional elements, into a substantially collimated coherent light beam 219. A cylindrical lens 221 forms a light beam 223 that is converging in one direction while remaining collimated in a direction orthogonal thereto. A portion of the light beam 223 passes through the aperture 203 to illuminate the sound track of the movie film 201 which is the subject of the holographic recording. After passing through the movie film sound track, the information carrying light beam 225 passes through a rim of the wheel 207 made of optical quality glass and out of a depressed surface 227 of the rim shaped to act as a lens for directing the information carrying beam 225 into the aperture 229 of the mask 213, and thereby impinge upon a predetermined portion of the holographic detector 211 for recording thereon. A portion of the light beam 223 also travels directly to the aperture 229 in the form of a reference beam 213 which interferes with the information carrying beam 225 on the hologram record 211 at the aperture 229.

A preferred lens-like depressed surface 227 is shown in cross-section with an enlarged scale in FIG. 22B. The generally curved portion 251 is designed to control the shape of the information-modified beam 225 to fill the entire aperture 229 with uniform illumination in the absence of the movie sound track. The wavefront curvature of the information modified beam 225 need not be related to the axis of rotation 233 since the surface 227 rotates and remains fixed with respect to the hologram detector 211. The raised lens element 251 is positioned at an angle with respect to the object-modified beam 225 and thereby changes the beam's direction uniformly thereover.

A periodically deformed dispersive structure 253 may be added to the lens element 251 for construction of a holographic sound track having a redundancy in a direction normal to the length of the sound track. If utilized, the periodic depressions of the dispersive structure 253 are preferably parabolic in shape. The dispersive structure 253 imparts a phase variation across one dimension of the information modified beam 225. Alternatively, a periodically varying intensity variation may be imparted across one dimension of the beam 225 by an appropriate modulating structure replacing the dispersive structure 253.

If the above noted requirements as to the curvature of the hologram detector and movie sound track illumination beams are satisfied, the laser 215 may be continuous wave and the wheel 207 rotated at a uniform angular speed until the entire movie sound track is holographically recorded. However, the mechanical difficulty of rotating the wheel 207 about the axis 233 within a small fraction of one wavelength of light often makes it preferable to use a laser 215 of the short periodic pulse variety to effectively stop motion of the wheel during each exposure pulse. The laser pulse rate, aperture size, and angular speed of rotation of the wheel 207 are coordinated so the edges along the hologram record sound track resulting from successive exposures are neatly matched to prevent audio noise from discontinuities between successive exposures. Additionally, these edges are made far enough apart so that any noise upon replay of the hologram record is of low frequency below the audio range and thereby following filtering of the noise.

An alternate method for relaxing the mechanical stability requirements of the wheel 207, is to advance it intermittently while a continuous wave laser is shuttered to make an exposure while the wheel 207 is stationary.

The size of the aperture 229 in the vertical direction shown in FIG. 22A is determined by the width desired of the holographic sound track which is about ½-1 mm. for a 4 mm. wide holographic record film. The minimum horizontal dimension of the aperture 229 as shown in FIG. 22 is determined by the desired resolution of the holographically reconstructed sound track image. This minimum dimension is fixed by the wavelength of light and the difference between the radii of curvature $r_1$ and $r_2$. If a pulsed laser is utilized, this dimension is likely to be substantially larger than the resolution determined minimum dimensions. The vertical dimension of the aperture 203 as shown in FIGS. 22A is determined by the size of the movie film sound track which is generally 2–3 mm. in width. The horizontal dimension of the aperture 203 as shown in FIG. 22 is not critical but it does determine the number of effective exposures to which any one area on the holographic record film 211 will be subjected. The preferred horizontal extent of the aperture 203 is that shown in FIG. 22 which is the same angular extent in radians as is the horizontal dimension of the aperture 229. Both apertures should be apodized to reduce diffraction noise.

The wheel of FIGS. 22–22B is not the only satisfactory way of recording a movie sound track as a continuous elongated hologram but is preferred for several reasons. By drawing the detector 211 in an arcuate path with a center of curvature substantially coincident with the center of curvature of the reference beam 231, all portions of the reference beam make substantially the same angle of 90° with the detector 211 in its direction of travel. The advantage here is that it is possible to draw the developed holographic sound track along its length through an image reconstructing light beam wherein all portions of the reconstructing beam make the same 90° angle with the hologram in its direction of travel. This avoids image brightness fluctuations caused by the Bragg effect in a thick emulsion detector when other continuous holographic recording configurations are utilized. Furthermore, by drawing the detector 211 in a circular path about the center of curvature of the reference beam 231, the completed hologram detector may be flattened and passed through a substantially collimated reconstructing light beam to obtain images therefrom. This has the advantage that the hologram record player is simplified, as discussed hereinafter.

Use of the wheel described with respect to FIGS. 22–22B is additionally preferred for holographically recording a sound track since the movie sound track 201 and the hologram detector 211 are maintained a fixed distance from each other and because the movie and detector are advanced with equal angular velocity through the light beam. By the movie sound track 201 and the hologram detector 211 moving at the same angular velocity, a ratio of their linear velocities is always a constant, as is a ratio of the distances traveled by the movie and the detector between intermittent exposures. In order to construct a hologram from which an image of uniform magnification may be reconstructed, these ratios must be equal at all times while the hologram is being constructed to a ratio of distances between the reference beam center of curvature and the illuminated portions of the movie and detector. This condition may be maintained by other recording techniques but not as easily.

Figure 23:
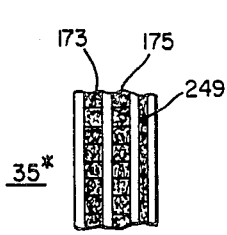
FIG. 23 shows a holographic record including both color video information and a holographic sound track.

A continuous holographic sound strip may be added according to the apparatus illustrated in FIGS. 22–22B to available space of any of the holographic records illustrated herein, such as those shown in FIGS. 2, 6, 15 and 16. FIG. 23 illustrates the video holographic record of FIG. 16 with a continuous sound track 249 added thereto which is approximately ½-1 mm. in width.

FIGS. 24 and 24A show a record player which incorporates a preferred technique for reconstructing sound information from a continuous hologram of a movie sound track. A narrow collimated beam of light 235 is shown through the holographic sound track of a hologram record 211. Part of this beam is diffracted into an image carrying beam 236 while an undiffracted beam 238 is blocked in some convenient manner. Use of a collimated reconstructing beam to obtain sound information of a hologram record is preferred since such a beam may be derived from the output of the laser 79 with very litle additional apparatus. A beam splitter 251 and a mirror 255 provide the desired beam 235.

If the sound track image formed in the diffracted beam 236 were utilized directly, the sound response may not be adequate since this image can only be as large as the area of the reconstructing beam 235. Therefore, the diffracted beam 236 is magnified in one direction by a double concave cylindrical lens 237 to form an expanded diffracted beam 241 which casts a magnified image upon a cylindrical mask 243. A narrow slit 245 is provided in the mask and an appropriate photodetector 247 is positioned behind the slit 245 to convert the average light falling thereacross into an electrical signal. The sound track image reconstructed from the hologram record 211 is magnified in a direction only along its length since it is the image variations along the length thereof that are to be detected. It is not necessary to detect variations of the sound track image along its width, so a magnification in this direction is not provided in order to allow a more compact record player unit. Furthermore, any aberrations or distortions in the sound track image across its width as a result of the curvature of the reconstructing beam 235 being different than the curvature of the reference beam 231 which was utilized in constructing the holographic sound track is of little concern since the photodetector 247 averages the light across the width of the image.

It will be noticed in FIGS. 24 and 24A that the sound reconstruction is accomplished along with color video information reconstructed from the same hologram record. The combination video and sound player has been shown to include a two detecting tube color video system described with respect to FIG. 17 but, of course, such sound reconstruction may be combined with any of the other specific video players described hereinabove.

It should be noted that the addition of sound by the holographic recording process of this invention complicates the holographic record player very little, thus leaving it a reliable and simple device for use in the home with an individual color television set. Modifications to provide an even less complex record player are shown in FIG. 25. A continuous wave laser source (not shown) of low power emits a substantially coherent beam 263 which is directed without optics, in a preferred embodiment, onto the opposite side of the continuously moving holographic record 211 from that side illuminated during its construction. On the opposite side of the hologram record 211 is a spherical lens 267 positioned in front of the video channel 268 and having a refractory power and a position such that the zero order (undiffracted) light is brought to a point focus 269 in a position appropriate to reconstruct images of the desired magnification. The real space images 177 and 179 come to a focus a distance from the hologram 211 that is substantially equal to the distance of the zero order light point focus 269 from the hologram 211. A holographic sound track 270 is also illuminated with the coherent light beam 263 and the light diffracted thereby magnified by the cylindrical lens 237 to form a sound track image 272 which is detected as discussed hereinabove with respect to FIGS. 24 and 24A. For ease in manufacture, the lenses 267 and 237 may be formed as a unitary structure from a single piece of plastic or other optical material having the required refractory characteristics. It should be noted from FIGS. 24-25 that video and sound image reconstructions are offset from each other, and that the hologram record construction geometry has been chosen to bring about this result.

A modification of the playback geometry of FIG. 25 is shown in FIG. 25A. A hologram record 425 is constructed according to the methods described hereinbefore with a holographic sound track 430 near the middle of the elongated hologram record 425. A video channel 427 is recorded with luminance information of an object scene and a video channel 429 is recorded with the color information of the same object scene. The sound track 430 is placed in the middle of the hologram record 425 since a greater length thereof must generally be illuminated than of the video channels 427 and 429. This placement makes it easier, therefore, to use the circular reconstructing coherent light beam 263. When the hologram detector 425 is positioned in the light beam 263, the light is diffracted into two video signals and a sound signal which are all passed through a lens element 431 designed to image a luminance signal 433 and a color information signal 435 in desired positions in space. A small image 437 of the sound signal is also formed and is magnified by a second lens 439 to produce the desired size sound image 441. The lens 439 may also be shaped to correct for any astigmatism in the image 437 resulting from the hologram record 425 being reconstructed while flat when the sound track 431 thereof was constructed with the detector following a circular path.

When the elongated hologram record 211 of FIGS. 24–25 is constructed with a diverging reference beam as in FIGS. 1 and 1A, the converging reference beam shown in FIGS. 24 and 24A is preferred for reconstruction because the Bragg thick emulsion condition is more nearly satisfied than when the record 211 is illuminated with a collimated beam 263 shown in FIG. 25. However, if the video channel 268 of the hologram record 211 is constructed with a collimated reference beam according to the techniques described with respect to FIGS. 4 and 4A, the collimated reconstructing beam 263 of FIG. 25 is preferred since the Bragg thick emulsion condition may be more nearly satisifed.

An important objective of the techniques described herein in the specific embodiment of the invention is to be able to produce hologram record copies of high quality yet very low cost per record. The hologram records constructed according to the techniques described hereinabove are generally constructed on a high resolution silver emulsion photographic film or other high resolution photosensitive material. These master hologram records serve to construct a large number of copy hologram records on a photosensitive material of low cost. These copies are then distributed to consumers to be played out on a home television receiver according to the methods and apparatus described hereinabove.

A copying arrangement is shown in FIGS. 26 and 26A for a hologram record 212 containing both color video information and recorded sound information wherein the video information has been holographically recorded with a diverging reference beam according to FIGS. 1 and 1A. The record 212 is drawn along with an elongated photosensitive copy detector 281 through coherent reconstructing light. The master hologram record 212 is advanced between intermittent exposures to a diverging beam 287 a distance equal to its advance between exposures during construction according to FIGS. 1–1A. A coherent light beam 283 is passed through a spherical lens 285 to form the diverging beam 287 for illuminating the video track of the master hologram record 212. The diverging beam 287 is given a curvature related to that of the reference beam used to construct the video track and illuminates the hologram record 212 from its same side. A collimated coherent light beam 293 illuminates the holographic sound track of the master hologram record 212. It may be noted that the sound track is copied in a manner that is simpler than the manner in which the sound track of the master hologram was constructed wherein a wheel and diverging reference beam were employed. The beams 283 and 293 are most conveniently derived from a single laser light source (not shown) according to standard optical techniques. A portion of the intensity of the beams 287 and 293 is diffracted into virtual information carrying beams according to the information holographically recorded on the master record 212. The information carrying diffracted beams interfere with the undiffracted intensity portions of the light beams 287 and 293 at the hologram copy detector 281, thereby forming diffraction patterns at the copy detector for recordation thereon which correspond to those of the master hologram. The copy detector 281 is placed very close to the hologram record 212 so that the copy hologram has the same viewing aperture as the master record 212. The general principles of such a hologram copy technique are described by Brumm in *Applied Optics*, vol. 5, No. 12 (December, 1966), pages 1946–1947, and in his co-pending patent application S.N. 598,008.

To reduce the coherence requirements placed on a light source used to generate the reconstructing light beams used in copying a master hologram record, such as the beams 283 and 293 of FIGS. 26 and 26A, it is desirable to have very close contact between the master hologram record and the photosensitive copy material. Referring to FIG. 26, a vacuum chamber 294 is schematically indicated as a means for obtaining this close contact. A vacuum is applied to the chamber through an outlet 296. Such a vacuum chamber should be designed to reduce the pressure in the area between the hologram master record 212 and the copy material 281 without significantly reducing the pressure elsewhere. An apparatus for obtaining this result is disclosed in U.S. Pat. No. 3,468,606 Sept. 23, 1969).

In order to minimize reflections between the hologram record 212 and the copy material 281, a liquid gate is provided therebetween. It is a general technique to pass the hologram record 212 and the copy detector 281 through a liquid gate bath in order to assure presence of the liquid therebetween. However, in the copying system illustrated in FIG. 26, the vacuum chamber 294 has the capability of maintaining very close contact between the two films and thereby permits application of a liquid gate through a tube 298 to the area between the films just before they are drawn into the vacuum chamber 294 for exposure to the reconstructing light. Therefore, problems of maintaining a liquid-gate bath in a manner allowing the films to be drawn therethrough are eliminated. Such a use of a liquid-gate is not part of this invention but is the work of others to be claimed in a later application.

The real space image carrying beams can, alternatively, be reconstructed from the master hologram 212 but the virtual image carrying video beam is easiest to reconstruct since a diverging beam 287 is more convenient to use.

In reconstructing a copy hologram so constructed, the reconstructing beam or beams illuminate its side opposite so that illuminated during construction thereof and with a curvature approximately opposite to that of the beams used in the copy process. The methods and apparatus described hereinabove, such as in FIGS. 24–25, for reconstructing a master hologram record are applicable to the reconstruction of a copy hologram record 281 constructed as described herein.

The copy arrangement shown in FIG. 26 is simple and compact by having the audio and video tracks copied simultaneously upon reconstruction from a single light source. However, the audio and video tracks can be copied independently at different times with different sources.

There is great flexibility in the combination of light wavelengths and copy detector materials which may be utilized in the various steps which lead to the read out information from a hologram copy. The original hologram master record 211 may be constructed on a high resolution photosensitive film with coherent light of a wavelength $\lambda_1$ chosen in conjunction with the photosensitive film to give the highest quality master hologram record. This film may be, for example, Eastman Kodak 649F or Agfa 8E75 film, with the optimum light wavelength $\lambda_1$ within the visible region. This master hologram record is then copied with light of a wavelength $\lambda_2$ that is chosen in conjunction with the sensitivity of the copy detector. The preferred copy detector is a photosensitive monomer system that polymerizes when irradiated by ultraviolet radiation or visible light in the short wavelength (blue) region of the spectrum. Therefore, $\lambda_2$ does not equal $\lambda_1$ and since the original hologram detector has a finite emulsion thickness (about 7 microns for Kodak 649F and Agfa 8E75 film), the copying geometry should be optimized with respect to the Bragg diffraction effects. The optimum copying geometry is such that the Bragg conditions are met when the original hologram is reconstructed with the copying wavelength $\lambda_2$. The curvature and angle of intersection with the master record 212 of the reconstructing beams 287 and 293 are chosen to be related to the reference beam curvatures and angles of intersection utilized in constructing the hologram master record as their light wavelengths $\lambda_2$ and $\lambda_1$ are related. These relations which optimize the Bragg conditions have been deduced by applying the theory of thick holograms as discussed by Leith et al, "Holographic Data Storage in Three-Dimensional Media", *Applied Optics*, Vol. 5, August, 1966.

With thick holograms, the image intensity is a maximum when the Bragg angle conditions are met, which is a function of the geometry of construction, and the wavelength ratio between construction and reconstruction processes. It has been determined that when the Bragg condition and the grating equation are both satisfied, that $$\psi \simeq -\theta_i + \theta_r + \theta_s \qquad (10)$$

where
$\psi$ = angle formed by the diffracted image carrying beam and a normal to the hologram during hologram reconstruction;
$\theta_i$ = angle formed by the hologram illuminating beam with a normal to the hologram during hologram reconstruction;
$\theta_r$ = reference beam angle with a normal to the hologram during hologram construction;
$\theta_s$ = object beam angle with a normal to the hologram during hologran construction.

Therefore when the master hologram is copied with a wavelength of $\lambda_2$, the reconstruction beam angle that maximizes the image intensity is determined from equation (10) and the Bragg condition so that $$\theta_i = \sin^{-1}\left[\frac{1}{\rho}\sin\left(\frac{\theta_r - \theta_s}{2}\right)\right] + \left[\frac{\theta_r + \theta_s}{2}\right] \qquad (11)$$

where $\rho = \lambda_1/\lambda_2$

These relations hold for plane waves. For the case in which the reference beam has a finite curvature the optimum reconstruction beam curvature is determined from the expression, $$\frac{r_1}{r_2} \simeq \frac{1}{2}\left[1 + \frac{1}{\rho^=}\right]\frac{\cos\theta_i}{\cos\theta_r} \qquad (12)$$

where $r_1$ and $r_2$ are the radial distances from the hologram to the apparent point source of the reference beam during construction and the illuminating beam during reconstruction, respectively.

Also, the greater the emulsion thickness of the original hologram record, the smaller must be the difference between $\lambda_1$ and $\lambda_2$ or there will be a significant variation of the image intensity across the image field. With a 7 micron detector thickness and an object or image field extent of 25°, the intensity variation produced by the wavelength change from $\lambda_1 = 6328$ Angstroms to $\lambda_2 = 3500$ Angstroms is not significant.

It is preferable for several reasons to construct the initial master hologram record on photopolymer material with a light wavelength in the ultraviolet or near visible range. Thus, when the photopolymer master hologram is copied onto the photopolymer copy detector there is no wavelength change and, therefore, the thickness of the hologram master record is not a problem. A further advantage of employing a photopolymer material for the master hologram record is that copies made therefrom at ultraviolet or near visible wavelengths show an absence of noise resulting from light scattering resulting from silver grains of a conventional silver emulsion.

As described above, the copying wavelength in the ultraviolet is chosen because of the sensitivity of the preferred copy detector material. With the preferred photopolymer copy material, ultraviolet sources of coherent radiation are required. Examples of these sources include ultraviolet lasers such as Argon, Krypton, Neon, Cadmium and frequency doubled ruby lasers as well as mercury arc sources.

The copying geometry of FIGS. 26 and 26A is altered slightly when the video channel of the hologram record has been recorded with a collimated reference beam according to the technique described hereinbefore with respect to FIGS. 4 and 4A. FIG. 26B shows this modification in plan view. A master hologram record 345 contains a video channel recorded thereon according to the techniques of FIGS. 4 and 4A with a collimated reference beam. A holographic sound channel is also recorded thereon by the techniques described hereinbefore. The maximum brightness of diffracted light orders is obtained from such a holographic record from both the video and sound channels by illumination thereof with a collimated light beam. Therefore, this copying technique is convenient since a single collimated coherent light beam 347 may be utilized to illuminate both channels of the master holographic record 345 in order to transfer its holographic information onto a copy photosensitive detector 349. The detector 349 is preferably a photopolymer as described hereinabove with respect to the copy detector 281, and is processed after exposure in the same manner as is the photopolymer copy detector 281, which is described hereinafter. After processing, the copy hologram record 349 is preferably illuminated with a collimated reconstructing light beam from its opposite side from that side exposed during the copying process in order to reconstruct information therefrom, as described hereinabove with respect to FIG. 4B and FIG. 25.

A light wavelength change occurring between any of the three primary steps of constructing a master, constructing a copy and reconstructing images from a copy, is less of a problem with collimated light beams used throughout since the Bragg condition may be more nearly satisfied. Also, a single collimated beam which may be generated directly from a laser source, is easier to work with. Additionally, a hologram record 345 constructed with a collimated reference beam may be copied onto a copy detector 349 by continuous motion through an effectively continuous light beam 347. Intermittent exposures are not necessary, as they may be when a diverging beam is used to construct a master record and its copies, since the record 345 and the copy detector 349 are drawn through the light beam 347 along a plane of substantially uniform phase.

The copy holograms produced as described above can be reconstructed with a variety of coherent sources. The reconstructing light wavelength $\lambda_3$ in a home record player is selected on the basis of the availability of cheap, mass-produced small lasers. These include helium neon (6328 Angstroms), argon (5146, 4880 Angstroms) and cadmium (4450 Angstroms) gas lasers. To reconstruct video images, the laser may operate continuous wave or with a pulse rate sufficiently rapid to be effectively continuous from the standpoint of the sensitivity of the image detector tube. To reconstruct audio images, the laser preferably operates continuous wave. The thickness of the photosensitive copy detector is chosen for a given wavelength change between construction of the copy and its reconstruction. If the copy hologram is readout with a $\lambda_3 = 6328$ Angstroms (visible) after having been copied at $\lambda_2 = 3500$ Angstroms (ultraviolet) the photopolymer detector should have a sensitized layer with a thickness of about 10 microns or less. With this thickness and for this wavelength change, the image intensity attenuation is not significant.

Copying holograms at a wavelength other than that with which it was originally constructed will introduce aberrations in the reconstructed image. These aberrations, however, are minimized by decreasing the dimensions of the hologram. The aberrations listed in order of decreasing dependence on the hologram aperture are spherical aberration, coma, astigmatism, field curvature and distortion. The first four aberrations enlarge the size of the focused points in the image whereas the aberration of distortion tends to locate image points at other than replica points of the object but does not effect the size of the focused point. Also, distortion is not a function of the size of the hologram. With the methods of the present invention and with a hologram dimension of about 1 mm. only the distortion aberration is significant and may be corrected by optical means, or in the case of detection with a TV camera may be corrected in the electronics of the television record player.

One suitable group of photopolymers from which the material for the copy detectors 281 and 349 may be chosen is a photopolymerizable composition comprising an addition-polymerizable, ethylenically-unsaturated monomeric compound or mixture of compounds. This composition is capable of forming a high polymer by free-radical-initiated, chain-propagating addition polymerization, and a small proportion, by weight of said monomeric compound, of a free-radical-generating polymerization initiator system activatable by actinic radiation. Examples of the monomeric compounds are described in U.S. Pat. Nos. 2,760,863, 2,927,022, 3,261,686, and 3,380,831. Examples of the polymerization initiators are described in U.S. Pat. No. 2,760,863 and 2,951,758 and the French Patent No. 1,481,819.

In the preferred copy method, the master hologram record is illuminated with ultraviolet radiation so as to produce a new fringe pattern on the copy detector, as discussed hereinbefore.

The photopolymer detector is sensitive to actinic radiation and the holographic interference pattern is recorded on the detector by polymerization of the monomer in the areas of constructive interference of the coherent radiation. Following the exposure, the unexposed monomer becomes polymerized, either by intentionally exposing it to radiation or merely by allowing it to be exposed to sunlight or other ambient light. One might expect this to produce a uniform distribution of completely polymerized monomer and that the holographic fringe pattern would be eliminated. However, it has been shown that the photopolymer material retains a fringe pattern throughout its depth and that a permanent phase hologram is produced.

It has been theorized that during and following the holographic exposure, one or more of the components of the material in the unexposed regions between the diffraction pattern fringes diffuses into the polymerized volume of the fringes without further processing. Subsequent to this diffusion, the remaining monomer is polymerized by further processing of the detector, resulting in adjacent regions having different refractive indices.

There is also present a small surface relief but the major phase change produced during reconstruction results from the refractive index change within the volume of the detector rather than from the surface relief. The relative contributions to the image strength from the volume effect compared to that from the surface relief has been determined by measurements of the reconstructed image with and without a liquid-gate on the relief surface. Without the liquid-gate, the reconstructed image is the result of phase changes due to the volume and surface effect, whereas with the liquid-gate, the diffracted image is due to the volume effect alone. These measurements verify that the diffracted image is produced primarily by diffraction within the volume of the hologram.

Referring again to FIG. 26, a portion of the photosensitive detector 281 of a photopolymer type that has been exposed to the diffraction patterns created by the reconstructing beams 287 and 293 is drawn away from the illumination beams by some convenient apparatus, such as a take-up reel 295. a post exposure compartment 297 containing high intensity mercury lamps 299 may be provided in a position so that an area of the photopolymer detector 281 is drawn through the compartment 297 a few seconds after exposure to the diffraction fringe pattern. The ultraviolet component of the mercury lamp light output polymerizes the remaining monomer of the detector area, thereby fixing the diffraction pattern recorded thereon. The few second delay between exposure of an area of the photopolymer detector to the diffraction pattern and post-exposure thereof provides time for the diffusion, believed necessary, as mentioned above. The resulting copy hologram record appears to be transparent but is phase modulated according to the holographic information recorded thereon.

There are other detector materials which may be used in place of the preferred group of photopolymers listed above. A photopolymer material such as the monomer and polymerization initiator system described in Close et al, *Applied Physics Letters*, 14, Pages 159–160 Mar. 1, 1969), may be used. A thermoplastic material such as those types described by Urbach and Meier in *Applied Optics*, 5, 666 (1966), may be used. Photochromic materials such as those described in Kirk, *Applied Optics*, 5, 1684 (1966), are possibilities. Furthermore, photo-resist materials are useful, such as those described in Sheridon, *Applied Physics Letters*, 12, 316 (1968), and Shankoff, *Applied Optics*, 7, 2101 (1968).

The low cost and ease of operation of mercury lamps makes them desirable as a source of ultraviolet copying light. A narrow band interference filter can be used to narrow an ultraviolet line of a mercury lamp to 20 Angstroms or so. The imperfect coherence of radiation from ultraviolet sources such as mercury lamps is compensated by positioning the photosensitive layer of a copy detector immediately against the developed emulsion of a master hologram record during exposure. Thus it is generally preferable in any copying configuration to locate the master hologram record and the photosensitive copy material with there respective emulsions adjacent to each other.

Certain types of mercury lamps are convenient for producing substantially point or line sources of light which may be utilized as shown in FIG. 27. An effective point or line mercury source 301 illuminates the hologram master record 211 with a diverging beam of light 303. A copy detector 305, preferably a photopolymer detector, is thereby exposed to the diffraction pattern recorded on the master record 211. After this exposure, the copy detector 305 is post exposed by mercury lamps 307 in a manner discussed hereinabove with respect to FIG. 24.

The path that the master record 212 and the detector 305 take through the light beam 303 is calculated to maximize the brightness of the light diffracted by the record 212 by satisfying the Bragg condition. The video and sound tracks of the hologram record 211 may have to be exposed separately with the source 301 positioned differently for each or a single position of the source 301 may be utilized with a light curvature adjusting lens for either the video or sound track. When either the sound track or the video track or both have been constructed on the hologram record 212 with a reference radiation beam having rays normal to the hologram in a direction along its length, the source 301 of FIG. 27 is positioned along an axis of curvature of the hologram record 212 and the copy detector 305 traveling in an arcuate path.

It shall be understood that the invention is not limited to the specific arrangements shown, and that changes may be made within the scope of the appended claims.

What is claimed is:

1. A holographic record, comprising an elongated flexible film record member having a plurality of individual holograms constructed along its length in a touching relationship, each of said holograms containing a distinct piece of full color information that may be reconstructed with a single monochromatic spatially coherent light beam in a manner to form two spatially separated monochromatic images, one image corresponding to a luminance component and the other image corresponding to a color component of said distinct piece of full color information.

2. A holographic record, comprising an elongated flexible film record member having a plurality of individual holograms constructed along its length in a touching relationship, each of said holograms containing a distinct piece of full color information that may be reconstructed with a single monochromatic spatially coherent light beam in a manner to form two spatially separated monochromatic images, one image corresponding to a luminance component and the other image corresponding to a color component of said distinct piece of full color information, wherein each of said holograms reconstructs said other image which includes three superimposed primary color monochromatic signal images modulated onto distinct spatial carrier frequencies.

* * * * *